(12) United States Patent
Fleck et al.

(10) Patent No.: US 11,584,156 B2
(45) Date of Patent: Feb. 21, 2023

(54) SYSTEMS AND METHODS FOR LOCKING AND STABILIZING A WHEEL COVER ASSEMBLY

(71) Applicant: Moochout LLC, St. Paul, MN (US)

(72) Inventors: Jonathan E. Fleck, St. Paul, MN (US); John Thomas Calhoun, Shafer, MN (US)

(73) Assignee: Moochout LLC, St. Paul, MN (US)

( * ) Notice: Subject to any disclaimer, the term of this patent is extended or adjusted under 35 U.S.C. 154(b) by 771 days.

(21) Appl. No.: 16/584,203

(22) Filed: Sep. 26, 2019

(65) Prior Publication Data

US 2020/0086681 A1    Mar. 19, 2020

Related U.S. Application Data

(63) Continuation-in-part of application No. 16/477,841, filed as application No. PCT/US2018/014071 on Jan.
(Continued)

(51) Int. Cl.
    *B60B 7/06*    (2006.01)

(52) U.S. Cl.
    CPC ...... *B60B 7/068* (2013.01); *B60B 2900/1216* (2013.01)

(58) Field of Classification Search
    CPC .... B60B 7/068; B60B 7/04; B60B 2900/1216
    See application file for complete search history.

(56) References Cited

U.S. PATENT DOCUMENTS

| 2,726,900 A | 12/1955 | Lothar |
| D216,588 S | 2/1970 | Cannon |

(Continued)

FOREIGN PATENT DOCUMENTS

| CN | 1468738 | 1/2004 |
| CN | 205871610 | 2/2017 |
| GB | 2091652 | 8/1982 |

OTHER PUBLICATIONS

International Preliminary Report on Patentability issued for PCT/US2018/14071, dated Jul. 23, 2019, 6 pgs.
(Continued)

*Primary Examiner* — Scott A Browne
(74) *Attorney, Agent, or Firm* — Polsinelli PC

(57) ABSTRACT

Implementations disclosed and claimed herein provide a wheel cover system. In one implementation, an inward force exerted against a wheel cover of the wheel cover assembly in an inward direction towards the hub is received. The inward force overcomes a spring bias of a spring of the receiver and translates the wheel cover assembly in the inward direction. A first rotational force rotating the wheel cover assembly in a first direction is received. The first post guides and engages the first hook, and the second post guides and engages the second hook during rotation. A first positive feedback is generated in response to the inward force and the first rotational force. The wheel cover assembly is releasably locked to the receiver by translating the wheel cover assembly in the outward direction using an outward force generated by the spring bias. The outward force provides a second positive feedback.

18 Claims, 40 Drawing Sheets

Related U.S. Application Data 17, 2018, now Pat. No. 11,198,322, which is a continuation-in-part of application No. 29/626,802, filed on Nov. 20, 2017, now Pat. No. Des. 845,854, and a continuation-in-part of application No. 29/626,799, filed on Nov. 20, 2017, now Pat. No. Des. 844,524.

(60) Provisional application No. 62/736,848, filed on Sep. 26, 2018, provisional application No. 62/561,484, filed on Sep. 21, 2017, provisional application No. 62/447,308, filed on Jan. 17, 2017.

(56) References Cited

U.S. PATENT DOCUMENTS

| | | | |
|---|---|---|---|
| 3,515,005 A | 6/1970 | Brown | |
| 3,528,705 A | 9/1970 | Oldroyd | |
| 4,306,751 A * | 12/1981 | Wegner | B60B 7/18 403/337 |
| 4,357,053 A * | 11/1982 | Spisak | B60B 7/068 301/37.42 |
| 4,593,953 A | 6/1986 | Tokai-Rika | |
| D300,526 S | 4/1989 | Gilliam | |
| D303,648 S | 9/1989 | Clark | |
| 4,929,031 A * | 5/1990 | Shenq-Gwo | B60B 7/12 301/37.42 |
| D311,718 S | 10/1990 | Whitsel | |
| D317,746 S | 6/1991 | Carter | |
| 5,167,440 A | 12/1992 | FitzGerald | |
| 5,193,884 A | 3/1993 | Sheu et al. | |
| D338,867 S | 8/1993 | Teufel | |
| D340,439 S | 10/1993 | Carbone | |
| 5,294,189 A * | 3/1994 | Price | B60B 7/068 301/108.4 |
| D369,775 S | 5/1996 | Choi | |
| D377,162 S | 1/1997 | Maynard | |
| 5,645,324 A | 7/1997 | Wright et al. | |
| D389,445 S | 1/1998 | Noriega | |
| D390,181 S | 2/1998 | Morrison | |
| D401,127 S | 11/1998 | Plantz | |
| 5,853,228 A | 12/1998 | Patti | |
| D407,362 S | 3/1999 | Schardt | |
| D418,472 S | 1/2000 | Okamoto | |
| 6,070,947 A * | 6/2000 | Hoyle, Jr. | B60B 7/14 301/108.4 |
| D430,840 S | 9/2000 | Lampen | |
| 6,595,596 B1 * | 7/2003 | Polka | B60B 7/14 301/37.102 |
| D490,762 S | 6/2004 | Layman | |
| D491,874 S | 6/2004 | Cook | |
| 6,820,475 B2 | 11/2004 | Wallach | |
| D524,221 S | 7/2006 | Jones | |
| D528,963 S | 9/2006 | Horn | |
| 7,131,705 B1 | 11/2006 | Delvecchio | |
| D537,401 S | 2/2007 | Jones | |
| 7,467,829 B2 * | 12/2008 | Wright | B60B 7/14 301/108.4 |
| 7,611,211 B1 | 11/2009 | Roberts | |
| D632,628 S | 2/2011 | Mitchell | |
| D663,674 S | 7/2012 | Zane | |
| D720,277 S | 12/2014 | Dakin | |
| D726,084 S | 4/2015 | Chu et al. | |
| D744,923 S | 12/2015 | Polka | |
| D744,924 S | 12/2015 | Fleck | |
| D752,494 S | 3/2016 | Polka | |
| D776,037 S | 1/2017 | Fleck | |
| D796,412 S | 9/2017 | Aker | |
| D826,829 S | 8/2018 | Floyd | |
| D844,524 S | 4/2019 | Fleck | |
| D845,854 S | 4/2019 | Fleck | |
| 2013/0015698 A1 | 1/2013 | Butler | |
| 2013/0334869 A1 | 12/2013 | Kronemeyer | |
| 2014/0265533 A1 | 9/2014 | Polka | |
| 2014/0284994 A1 | 9/2014 | Polka | |
| 2015/0145317 A1 | 5/2015 | Willis | |
| 2016/0221388 A1 | 8/2016 | Van Oort et al. | |
| 2017/0130489 A1 * | 5/2017 | Ivarsson | B60B 7/068 |
| 2017/0157979 A1 | 6/2017 | Polka et al. | |

OTHER PUBLICATIONS

Examination Report No. 1 dated Aug. 27, 2019 for AU 2018211034, 2 pgs.
International Search Report issued for International Application No. PCT/US2018/014071, dated Apr. 4, 2018, 2 pgs.
Written Opinion issued in International Application No. PCT/US2018/014071, dated Apr. 4, 2018, 5 pgs.
Requisition by the Examiner issued Aug. 14, 2020 in CA3,050,481, 3 pgs.
First Office Action dated Aug. 3, 2020 in CN201880018735.3, 6 pgs.
Supplementary European Search Report issued in EP18742052, dated Nov. 30, 2020, 6 pgs.

* cited by examiner

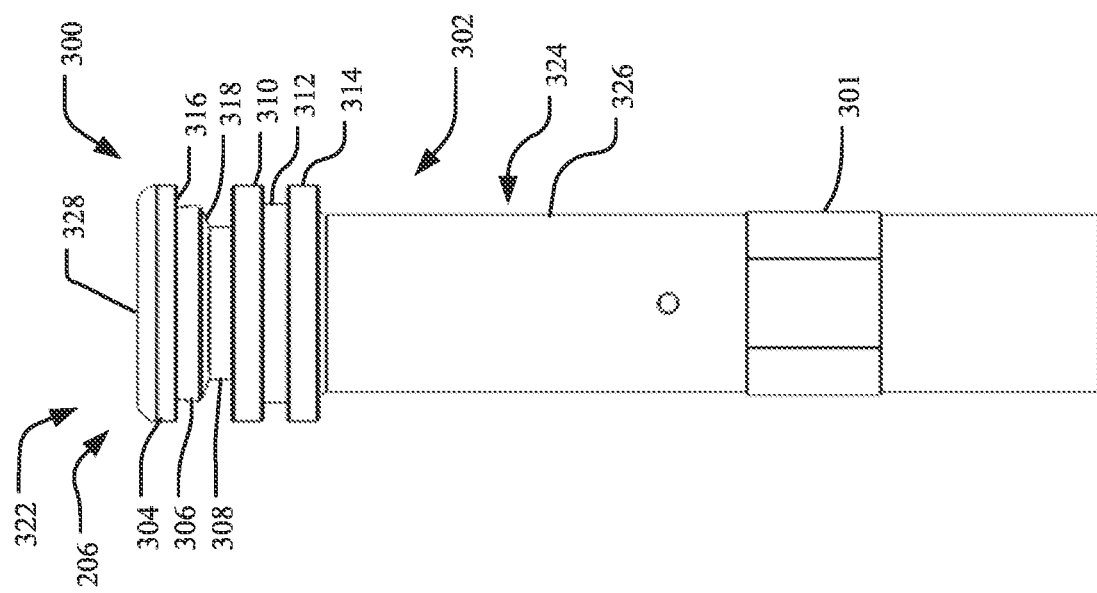
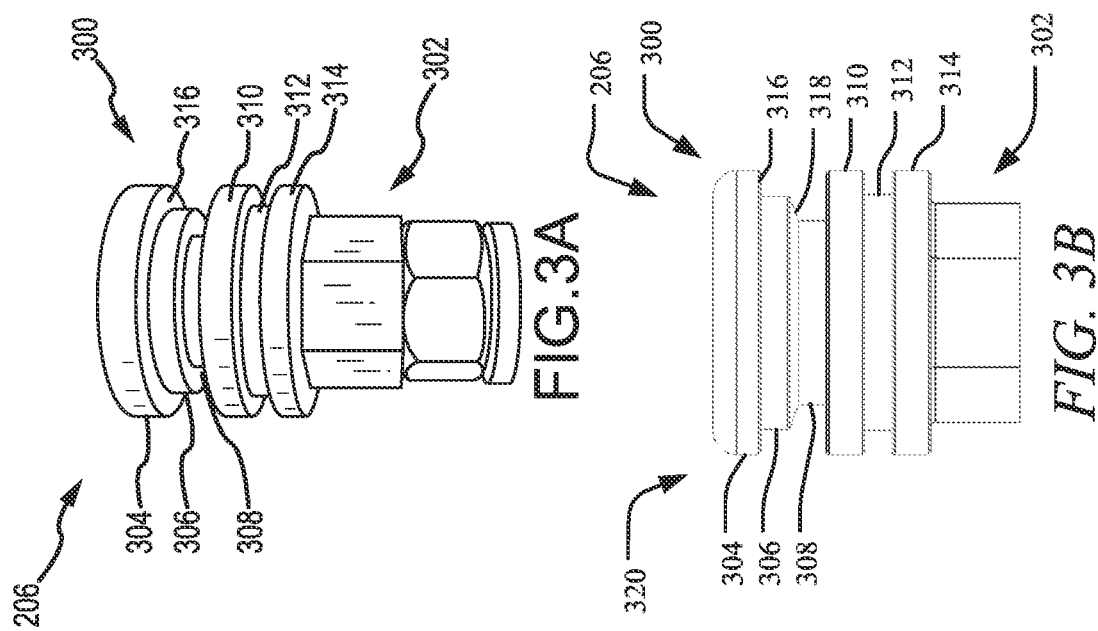

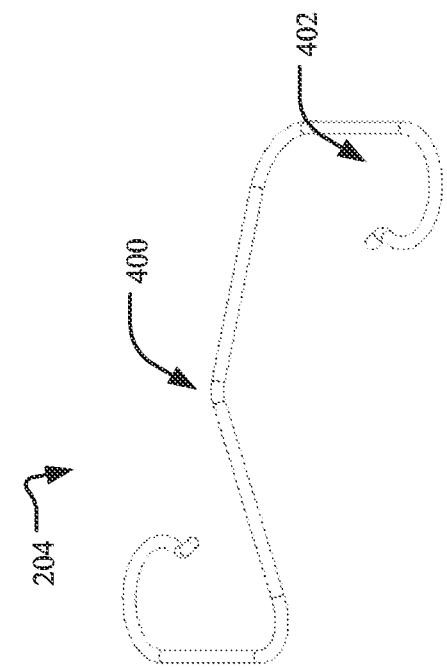
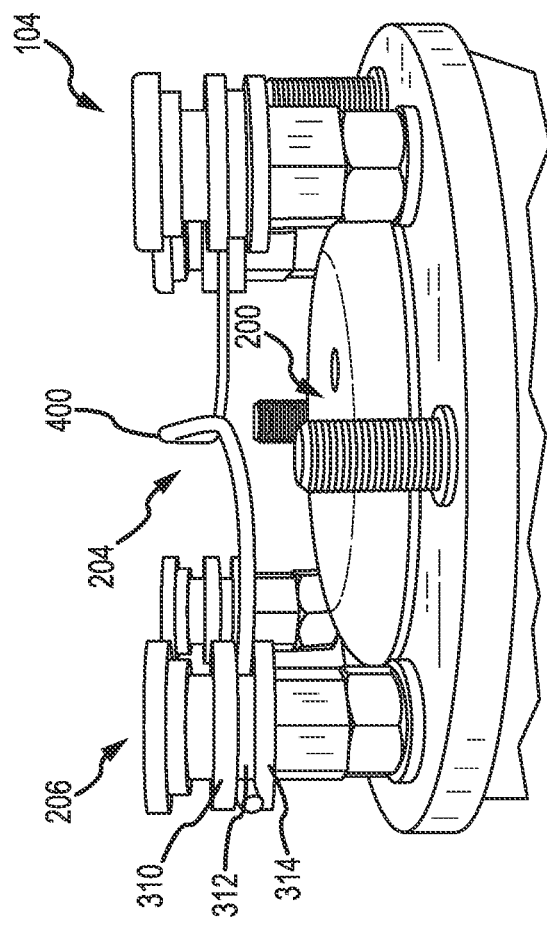
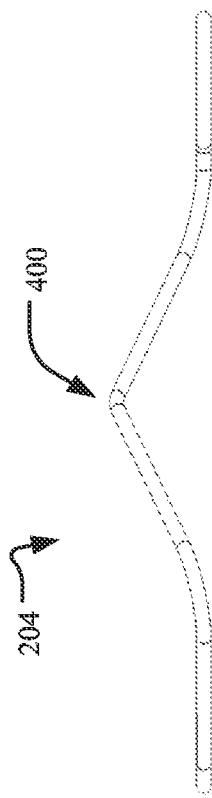
FIG. 4A
FIG. 4B
FIG. 4C

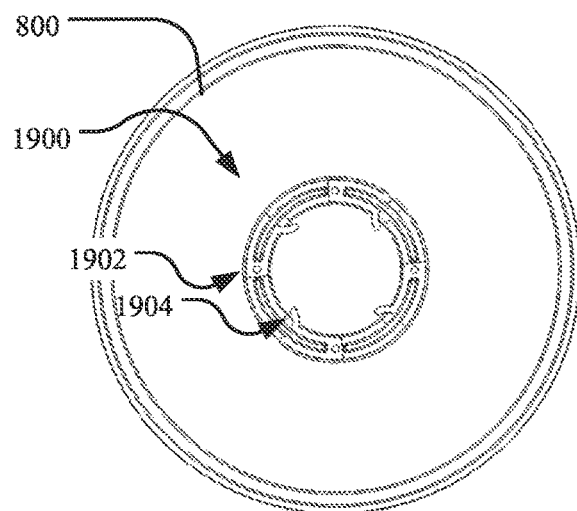
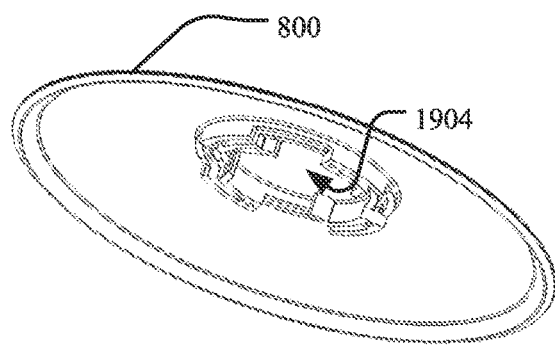
FIG. 19A  FIG. 19B
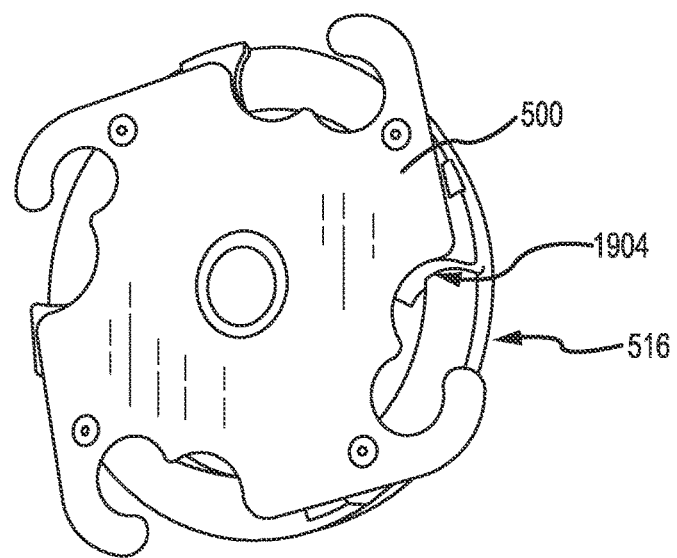
FIG.19C

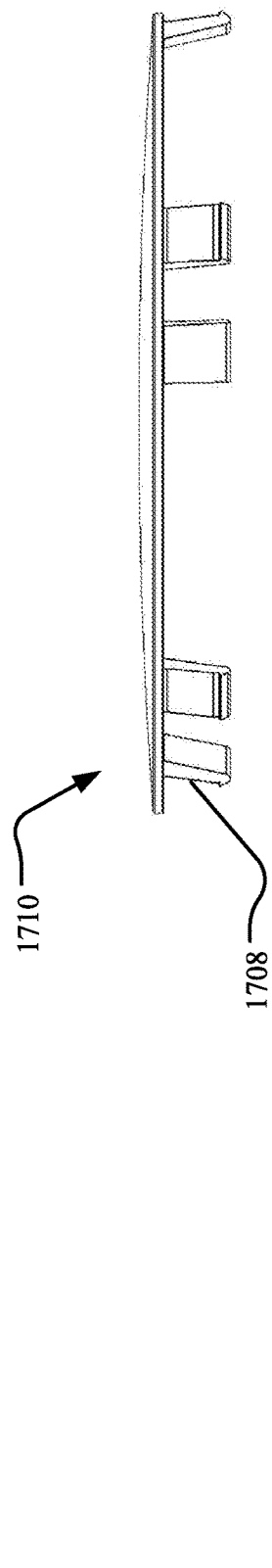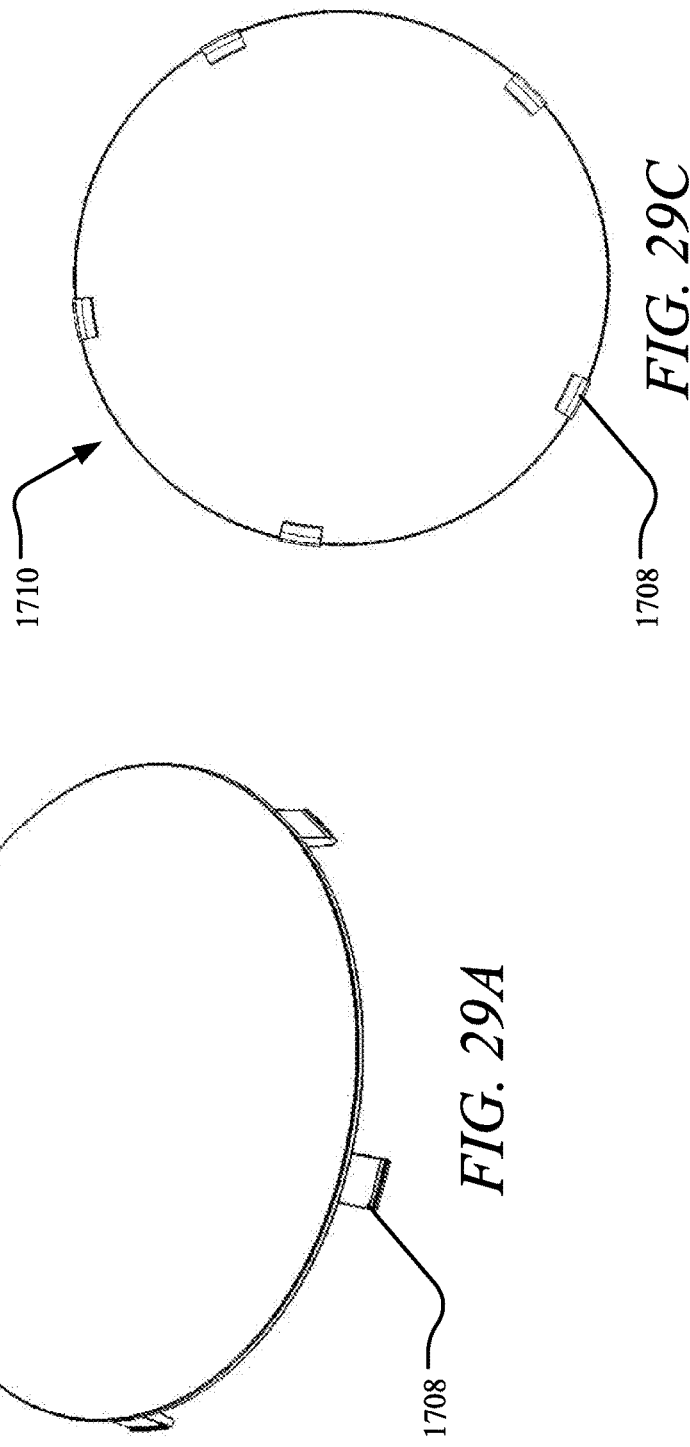

SYSTEMS AND METHODS FOR LOCKING AND STABILIZING A WHEEL COVER ASSEMBLY

CROSS-REFERENCE TO RELATED APPLICATIONS

The present application is a continuation-in-part of U.S. application Ser. No. 16/477,841, entitled "Wheel Cover Quick Mount" and filed on Jul. 12, 2019, which is a National Stage Application filed under 35 U.S.C. § 371 of International Application No. PCT/US2018/014071, entitled "Wheel Cover Quick Mount" and filed on Jan. 17, 2018, which is a continuation-in-part of and claims priority to U.S. Design application No. 29/626,799, now U.S. Design Pat. No. D844,524, entitled "Wheel Cover" and filed on Nov. 20, 2017, and to U.S. Design application No. 29/626,802, now U.S. Design Pat. No. D845,854, entitled "Wheel Cover" and filed on Nov. 20, 2017, and which further claims priority under 35 U.S.C. § 119 to U.S. Provisional Application No. 62/561,484, entitled "Wheel Cover Quick Mount" and filed on Sep. 21, 2017, and to U.S. Provisional Application No. 62/447,308, entitled "Wheel Cover Quick Mount" and filed Jan. 17, 2017. The present application further claims priority under 35 U.S.C. § 119 to U.S. Provisional Application No. 62/736,848, entitled "Wheel Cover Quick Mount" and filed on Sep. 26, 2018. Each of these applications is incorporated by reference in its entirety herein.

TECHNICAL FIELD

Aspects of the present disclosure relate to covers for motor vehicles wheels, and more particularly to systems and methods facilitating rapid mounting of a wheel cover having optimized aerodynamics to at least a portion of a wheel, such as the hub, tire, and/or axle, without the use of tools.

BACKGROUND

Wheel covers for vehicles (e.g., heavy trucks, trailers, or the like) typically streamline and keep wheels clean from dirt, rain, or other debris. Conventionally, wheel covers are installed by removing one or more lug nuts from the studs of a hub or wheel, placing the wheel cover on the studs, and screwing the lug nuts back onto the studs. Such conventional methods necessarily involve one or more tools, increasing the complexity and duration of wheel cover installation and removal. Further, many conventional wheel covers obstruct a view of the hub of the wheel during routine inspection and maintenance, requiring the wheel cover to be completely removed. Additionally, conventional wheel covers often include aerodynamic inefficiencies and/or include a significant number of components and/or material, resulting in wasted resources due to fuel consumption, manufacturing costs, installation/removal time, and/or the like. As such, conventional wheel covers are neither cost effective nor efficient in use. It is with these issues in mind, among others, that various aspects of the present disclosure were developed.

SUMMARY

Implementations described and claimed herein address the foregoing issues by providing a wheel cover system. In one implementation, a method includes covering a wheel of a vehicle with a wheel cover assembly. The wheel has a first stud and a second stud each extending in an outward direction away from a hub. A first post of a receiver is received in a first hook of an engagement plate of a wheel cover assembly, and the first post is engaged to the first stud. A second post of the receiver is received in a second hook of the engagement plate of the wheel cover assembly, and the second post is engaged to the second stud. An inward force exerted against a wheel cover of the wheel cover assembly in an inward direction towards the hub is received. The inward force overcomes a spring bias of a spring of the receiver and translates the wheel cover assembly in the inward direction. A first rotational force rotating the wheel cover assembly in a first direction is received. The first post guides and engages the first hook, and the second post guides and engages the second hook during rotation. A first positive feedback is generated by a spring in response to the inward force and the first rotational force. The wheel cover assembly is releasably locked to the receiver by translating the wheel cover assembly in the outward direction using an outward force generated by the spring bias. The outward force provides a second positive feedback.

In another implementation, a wheel cover system covers a wheel of a vehicle with a wheel cover assembly. The wheel has a first stud, a second stud, a third stud, and a fourth stud in a concentric pattern and each stud extends in an outward direction away from a hub. A first post, a second post, a third post and a fourth post are engageable to the first stud, the second stud, the third stud, and the fourth stud, respectively. An engagement plate includes a first hook, a second hook, a third hook, and a fourth hook engageable with each of the first post, the second post, the third post, and the fourth post, respectively. A spring has a first hook and a second hook. The first hook is engaged to the first post, and the second hook is engaged to the second post. The spring has a spring bias configured to generate an outward force in the outward direction away from the hub at a spring engagement point. A first cap is disposed in the first upper portion of the first post, and a second cap is disposed in the second upper portion of the second post. The first post and the second post are configured to releasably engage the wheel cover assembly with the spring, the first cap, and the second cap holding the wheel cover assembly in a locked position.

In another implementation, a wheel cover system covers a wheel of a vehicle with a wheel cover assembly. The wheel has a first stud and a second stud each extending in an outward direction away from a hub. A first post is engageable to the first stud. The first post has a first upper portion and a first lower portion, and the first upper portion is disposed outwardly from the first lower portion. A second post is engageable to the second stud. The second post has a second upper portion and a second lower portion, and the second upper portion is disposed outwardly from the second lower portion. A spring has a first hook and a second hook. The first hook is engaged to the first post, and the second hook is engaged to the second post. The spring has a spring bias configured to generate an outward force in the outward direction away from the hub at a spring engagement point. A first cap is disposed in the first upper portion of the first post, and a second cap is disposed in the second upper portion of the second post. The first post and the second post are configured to releasably engage the wheel cover assembly with the spring, the first cap, and the second cap holding the wheel cover assembly in a locked position.

In another implementation, a wheel cover has an outer surface and an inner surface. The inner surface has a plate receiver. An engagement plate has a body mounted to the plate receiver, and the body extends between a peripheral edge. A first hook is defined in the peripheral edge of the body, and the first hook is configured to releasably engage a first post of a receiver. A second hook is defined in the peripheral edge of the body, and the second hook configured to releasably engage a second post of a receiver.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIGS. 3A-3C illustrate detailed side views of an example post, an example short post, and an example long post, respectively, of a receiver.

FIGS. 4A-4C are a side view of a receiver including an example spring, an isometric view of the spring, and a side view of the spring, respectively.

FIGS. 19A-19B are a bottom view and isometric view, respectively, of an example backing of a wheel cover.

FIG. 19C shows an example engagement plate installed onto the backing.

FIGS. 29A-C are an isometric top view, side view, and bottom view, respectively, of an example cover cap for the wheel cover system of FIG. 21.

DETAILED DESCRIPTION

Figure 1:
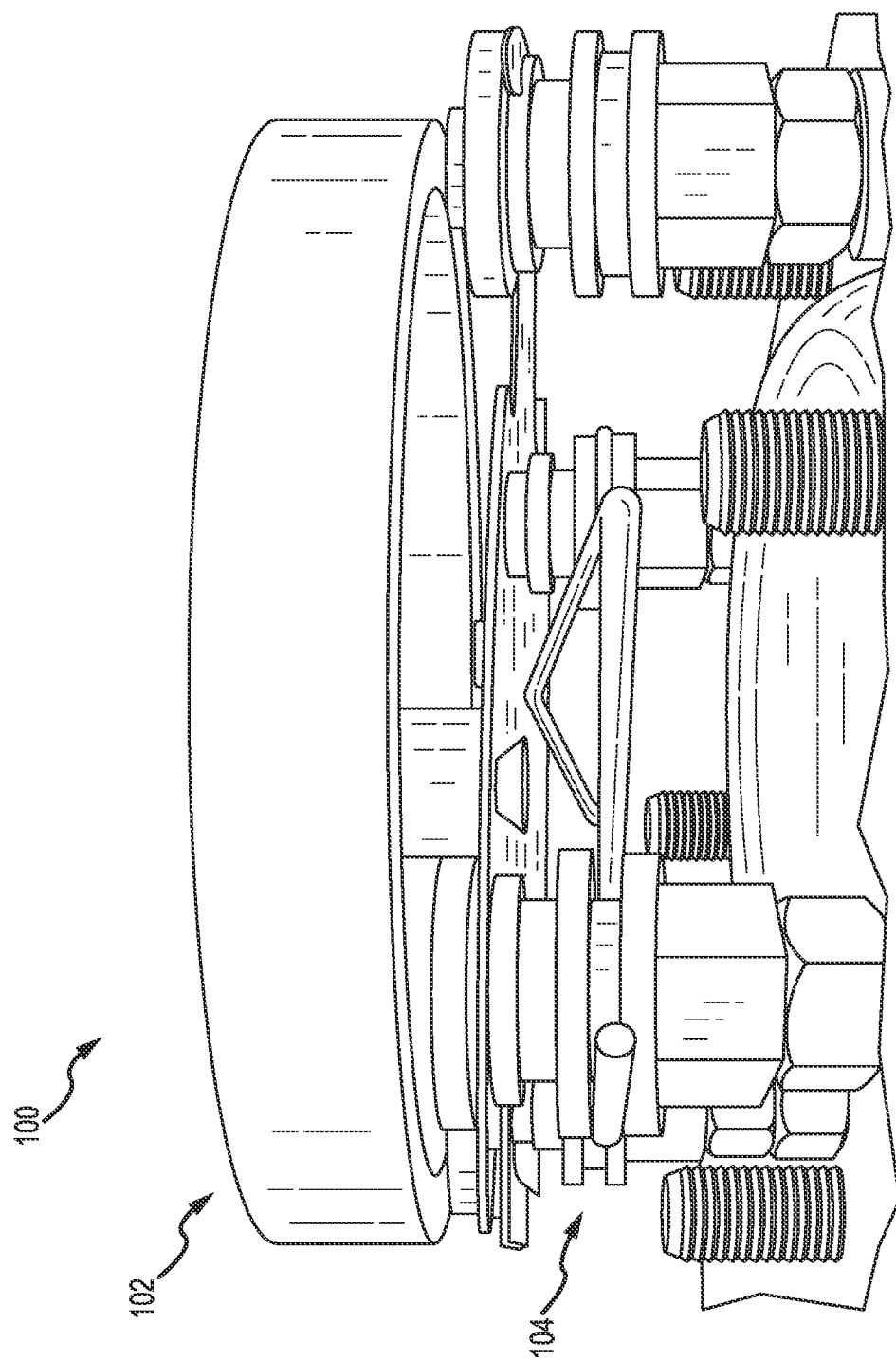
FIG. 1 illustrates an example wheel cover system.

Aspects of the present disclosure involve systems and methods facilitating rapid mounting of a wheel cover having optimized aerodynamics to at least a portion of a wheel, such as the hub, tire, and/or axle, without the use of tools. As described herein, the presently disclosed technology provides a wheel cover system that is low cost, lightweight, durable, easily-installed, low maintenance, and provides optimized aerodynamics resulting in fuel cost savings. More particularly, the wheel cover system provides an aerodynamic shape generating an optimized miles per gallon of fuel savings for a vehicle. Further, the wheel cover system is lightweight with minimal parts and can be completely installed in a minute or less with routine inspections performable in seconds. The wheel cover system may be customized for a front wheel addressing the paddle-wheel effect of the vehicle's front wheel studs. Other advantages and features of the presently disclosed technology will be apparent from the present disclosure.

In one aspect, the wheel cover system includes a receiver comprising a spring installed onto a plurality of posts configured to receive a wheel cover. The wheel cover includes an engagement plate with hooks and grooves. To install the wheel cover, the wheel cover is aligned with the posts and spring until larger grooves are positioned near each post. An inward force is exerted onto the wheel cover to compress the spring, and the wheel cover is twisted to engage the smaller grooves around the posts. When the wheel cover is released, the spring translates the wheel cover outwards, thereby providing a positive feedback to the installer and locking the engagement plate against the caps of each post. The spring bias in combination with a change in diameters of radius cuts in the engagement plate and steps in the posts prevent the wheel cover from disengaging from the receiver by rotating clockwise or counter-clockwise. Once engaged, a cap may be removed from the wheel cover for quick routine maintenance of the wheel. To remove the wheel cover, the inward force is applied, overcoming the spring bias, and the wheel cover is rotated until disengaged from the receiver.

The wheel cover system can also include additional accessories to aid in stabilization of the posts. In one example, the stabilization assembly can include a plurality of stabilization bars. Each of the bars includes a first open end and a second open end and each end operable to receive a portion of a post. The bars are positioned between a pair of posts where a first open end of one bar contacts the same post as a second open end of another bar. The first open end and the second open end are fastened together to create an interference between the bars and the post, such that vibration experienced at the post is transferred to the bars, thereby stabilizing the post.

The wheel cover system can also include a locking mechanism which can, for example, prevent theft of the wheel cover system. The locking mechanism is installed onto an engagement plate and hidden behind a wheel cover, with a keyway accessible at the wheel cover to engage the locking mechanism. The locking mechanism includes a pair of bars coupled to a center mechanism and secured to the center mechanism by a receiver receptacle. When the locking mechanism is rotated in one orientation (e.g., counter-clockwise), the pair of bars are retracted towards the center mechanism. When the locking mechanism is rotated in a second orientation (e.g., clockwise), the pair of bars are pushed away from the center mechanism and are disposed adjacent to a top surface of a pair of posts. The pair of bars obstruct a distance between the pair of posts and the wheel cover required to push the wheel cover down for removal disassembly, thereby preventing the wheel cover from being removed from the wheel.

To begin a detailed description of an example wheel cover system 100, reference is made to FIG. 1. In one implementation, the wheel cover system 100 includes a receiver 104 configured to receive and engage a wheel cover assembly 102. Stated differently, the cover assembly 102 is configured to couple a wheel cover to a hub of a wheel via the receiver 104. The cover assembly 102 may be multiple pieces coupled to each other or one integral, singular piece.

Figure 2:
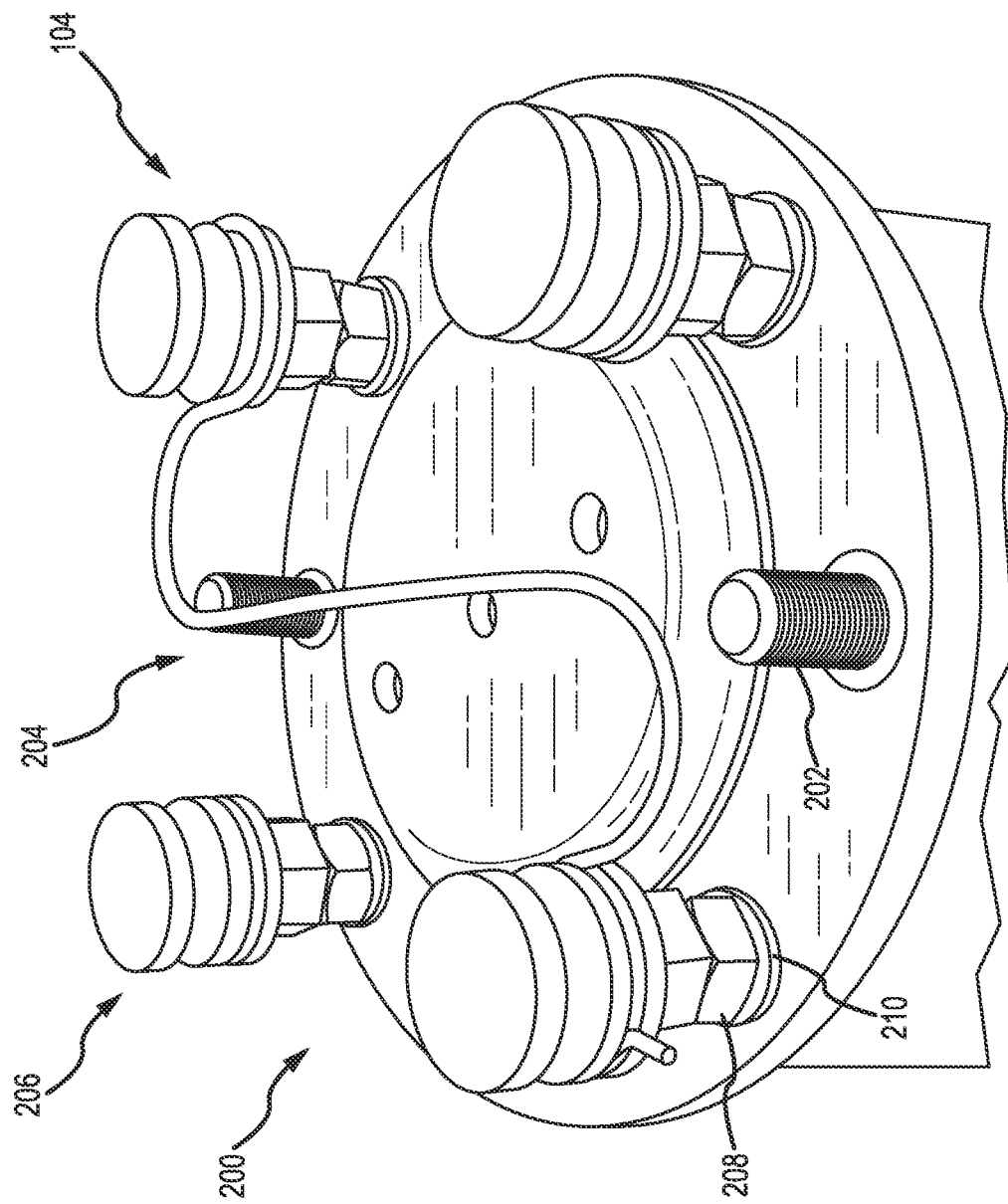
FIG. 2 shows an example receiver of the wheel cover system mounted on a hub of a wheel.

As can be understood from FIGS. 2-4C, in one implementation, the receiver 104 is installed onto a plurality of studs 202 of a hub 200. The receiver 104 includes a spring 204 connected to a plurality of posts 206. As shown in FIG. 2, each of the posts 206 is engaged to and extends outwardly from one of the studs 202. A spacer 210 and a lug nut 208 may also be installed on each of the studs 202, providing additional clearance height to each of the posts 206. The spacer 210 and the lug nut 208 may be disposed proximal to the hub 200 from the post 206. It will be appreciated that any number of posts 206 may be included depending on arrangement of the wheel cover assembly 102 and the studs 202. For example, the receiver 104 may include four posts 206 arranged in two diametrically opposed pairs, as shown in FIG. 2. In one implementation, a first pair of diametrically opposed posts 206 is circumferentially separated from a second pair of diametrically opposed posts 206 by two pairs of diametrically opposed uncovered studs 202.

In one implementation, the spring 204 is mounted onto the first pair of diametrically opposed posts 206, as shown in FIG. 2. It will be appreciated that additional springs 204 and/or mounting orientations are contemplated. The spring 204 has a spring bias for releasably locking the wheel cover assembly 102 onto the posts 206. More particularly, to install the wheel cover, a force is exerted against the spring, and once the force is strong enough to overcome the spring bias, the wheel cover assembly 102 may be rotated until engaged to the posts 206. Once the posts 206 stop the rotation of the wheel cover assembly 102, the force is desisted resulting in the spring bias of the spring 204 causing the wheel cover assembly 102 to translate in a direction opposite the application of the force and lock in place. The translation of the wheel cover assembly 102 generates a positive feedback in the form of a small jolt or similar tactile sensation confirming the wheel cover assembly 102 is secured to the receiver 104.

Because the posts 206 are engaged to and extend from existing studs 202 of the hub 200 and the spring 204 does not impede visual access to the hub 200, the receiver 104 provides generally unobstructed views of the hub 200. Such an arrangement provides many advantages, including without limitation, performance of routine maintenance without removal of the receiver 104; ability to mount additional components to the hub 200, such as a hub meter; and the hub 200 can include unobstructed signage or a viewing screen showing a message, such as an advertisement, that is projected onto or otherwise visible on the wheel cover.

In one implementation, the receiver 104 falls within the circumference of the center of the wheel when mounted onto the hub 200, allowing for removal of the tire or other portions of the wheel without the removal of the receiver 104. The receiver 104 may also be installed onto a wheel such that the cover assembly 102 would cover the lug nuts. Moreover, the receiver 104 does not require any evidentiary mounting mechanism such as in conventional systems, allowing the cover assembly 102 to obtain optimized aerodynamic shape. In one implementation, the posts 206 are mounted to a plate to permit the use of the wheel cover system 100 on trailer hubs to cover the wheels. The plate would permit hubs that do not have significant mounting points, such as the studs 202, to install the plate with the posts 206 for mounting the cover assembly 102. In other implementations, the posts 206 are mounted onto other components. For example, the posts 206 can be mounted to an automatic tire inflating device, such as the Aperia Halo, or the like. The inflating device bolts onto a wheel and attaches to the air intake of the wheel to monitor and automatically inflate the tire, as needed. The device extends tire life, increases miles per gallon, and prevents blowouts due to underinflated tires.

As can be understood from FIGS. 3A-3C, the posts 206 may have a variety of shapes, sizes, and features. For example, the post 206 may have a short profile 320 or a long profile 322. In one implementation, the post 206 includes an upper portion 300 and a lower portion 302. The lower portion 302 includes a stem 324 having a stem surface 326. The upper portion 300 begins with a first cap 304 disposed on the end of the post 206 having a top surface 328 and configured to prevent the cover assembly 102 from translating outwardly in a direction away from the hub 200, thereby disengaging from the post 206. The first cap 304 also has a cap bottom surface 316 configured to contact the cover assembly 102 when engaged with a plate 500. A taper 318 guides the cover assembly 102 into position during installation and removal based on an applied force and the spring bias of the spring 204. The post 206 further includes a hook step 306 and a neck step 308. In one implementation, the hook step 306 has a larger circumference than the neck step 308. A second 310 and a third 314 cap frame a spring step 312. The spring step 312 is configured to receive and engaged the spring 204. In one implementation, the second 310 and the third 314 caps each have an equal circumference larger than a circumference of the spring step 312. The lower portion 302 includes a threaded opening configured to receive the stud 202, enabling the post 206 to be rotationally advanced onto the stud 202. An adhesive, such as Loctite, welding, and/or other attachment mechanisms may be used to further secure the post 206 to the stud 202.

In one implementation, the first 304, second 310, and third 314 caps have a circumference equal to each other. However, the circumferences may differ from each other or two circumferences may be equal to each other while a third circumference is different. Additionally, the posts 206 may be manufactured with varying lengths to accommodate different wheel dimensions. For example, a front wheel of a semi-trailer truck may have the posts 206 with the short profile 320, as shown in FIG. 3B, while a rear wheel may have the posts 206 with the long profile 322, shown in FIG. 3C. The long profile 322 can accommodate a greater offset for rear dual-wheels. The posts 206 may be made of a hard material such as steel, aluminum, plastic, thermoplastic, and/or the like. In an example implementation, the posts 206 are manufactured from polyoxymethylene. After or while the posts 206 are installed onto the hub 200, the spring 204 may be also installed.

Turning to FIGS. 4A-4C, in one implementation, the spring 204 includes a spring engagement point 400 where the spring 204 meets the cover assembly 102 during cover installation. The spring bias of the spring 204 may be configured to generate an outward force concentrated at the spring engagement point 400. The spring 204 also includes a plurality of spring hooks 402. In one example, the spring 204 has two hooks 402 in a semi-circular shape, as shown in FIG. 4B. The hooks 402 extend linearly away from each other, then bend and increase in angle until they reach the engagement point 400. The combination of the semi-circular hooks 402 and flexibility of the spring 204 allow the spring hooks 402 to hook around and engage two posts 206 at the spring step 312 of each post 206, as shown in FIG. 4A. However, it will be appreciated that the spring 204 can be mounted onto more than two posts 206 or onto one post 206 and bent outwards to provide the spring bias force to maintain the plate 500 in place. The receiver 104 may be permanently affixed or removably engaged to the hub 200, with the wheel cover assembly 102 removably engageable to the receiver 104.

Figure 5B:
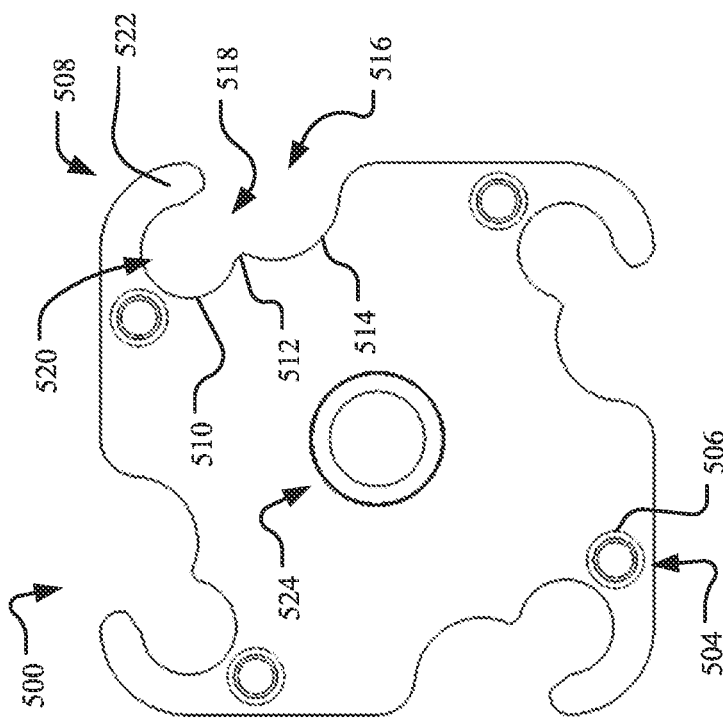
FIGS. 5A-5B show an example wheel cover assembly and an engagement plate, respectively.
Figure 5A:
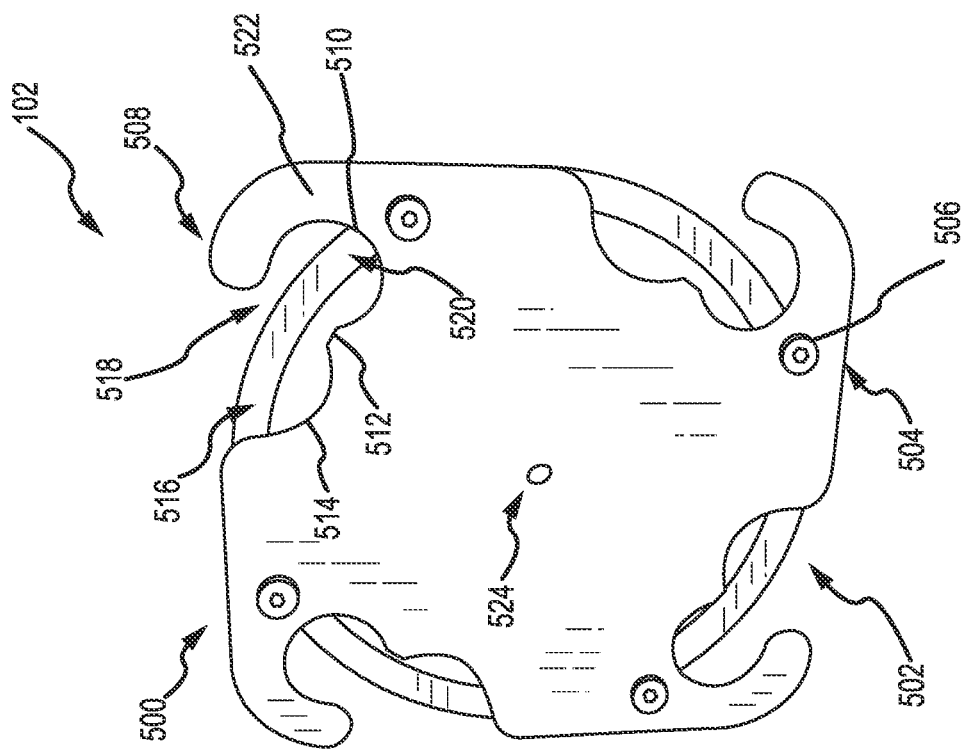

For a detailed description of the wheel cover assembly 102, reference is made to FIGS. 5A-5B. In one implementation, the cover assembly 102 includes an engagement plate 500 and a cover back 502, illustrated as a ring in FIG. 5A. The ring is merely for illustrative purposes to demonstrate the connection of a wheel cover to the engagement plate 500. The cover back 502 may be coupled to the plate 500 with screws 506 that extend through a plurality of openings 504 in the plate 500 and the cover back 502. Although the plate 500 and the cover back 502 are shown as two separate components attached via screws 506, the plate 500 and the cover back 502 can be one integrated unit or attached via other means. The cover back 502 can also be integrated into the wheel cover 800.

The plate 500 may include a body with radius cuts of different diameters to engage the steps in the posts 206 having different diameters. In other words, the plate 500 positively engages the plurality of posts 206 by a precise mating of the radiused plate 500 to the radiused plurality of posts 206. The plate 500 includes a plurality of hooks 508 disposed about and defined in a peripheral edge of the body. The hooks 508 may be oriented relative to a center hole 524. In one implementation, the plate 500 has four hooks 508; however, there can be more or less than four hooks 508 and the plate 500 can be any shape including, but not limited to, a rectangle, octagon, oval, or circle, as well as having various ornamental features. Furthermore, other wheel end elements providing quick detachment to expose the hub 200 and other wheel components such as, but not limited to, a hub odometer or tire inflation device can be mounted onto the plate 500 in addition to, or in place of, a wheel cover.

In one implementation, the hook 508 includes a hook surface 522 and a hook edge 510 defining a hook receiving area 520. The hook receiving area 520 is adapted to snugly fit around the hook step 306 because the hook receiving area 520 has a radius equal to or substantially equal to a radius of the hook step 306. Adjacent to the hook edge 510 is a neck edge 512 which, together defines a neck receiving area 518. The neck receiving area 518 allows the post 206 to pass through at the neck step 308 during cover installation and prevents the plate 500 from rotating when the plate 500 is fully engaged on the post 206. Adjacent to the neck edge 512 is a cap edge 514 defining a cap receiving area 516. The cap receiving area 516 is adapted such that the first cap 304 can outwardly pass through the cap receiving area 516 at the beginning of installation because the cap receiving area 516 has a radius equal to or greater than the radius of the first cap 304. The cap receiving area 516 and the hook receiving area 520 may be formed as a first groove and a second groove, respectively, wherein the first groove is larger than the second groove. The plate 500 may be positioned 3.5" from dead center of a typical 8-bolt hub assembly such that the radius from the center of the plate to engagement of the post 206 is 3.5". The plate 500 can be made of a hard material such as, but not limited to, steel, aluminum, plastic, thermoplastic, or the like. In one implementation, the plate 500 is manufactured from a 0.060" thick sheet of 304 stainless steel.

Figure 6:
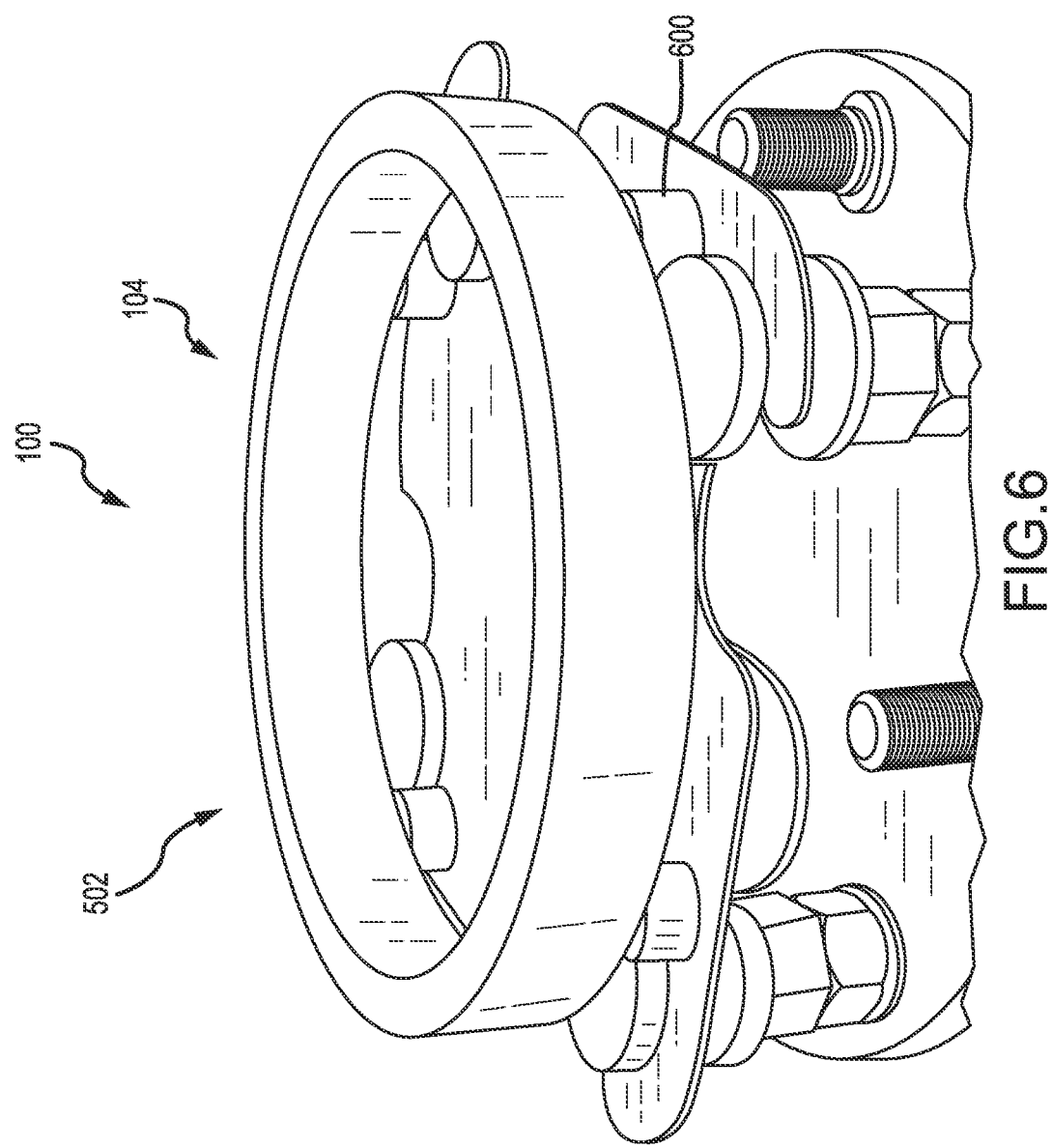
FIG. 6 depicts the wheel cover assembly mounted to the receiver.
Figure 7:
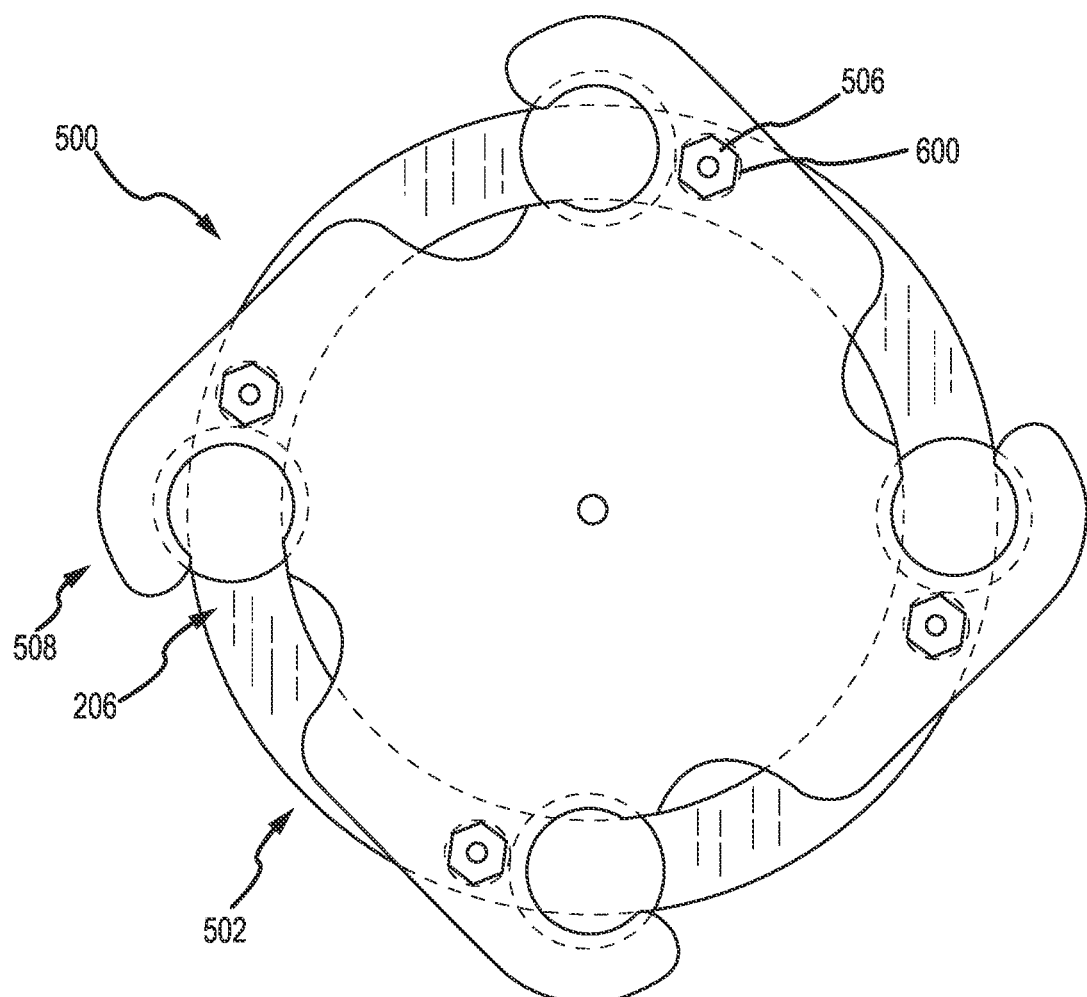
FIG. 7 shows another example of the wheel cover assembly.

Referring to FIGS. 6-7, in one implementation, a plurality of spacers 600 are configured to maintain a distance between the cover back 502 and the plate 500, such that when the wheel cover assembly 102 is installed onto the receiver 104 and the cover back 502 contacts the first caps 304, the plate 500 drops into position for installation. Although the spacers 600 are shown as separate components, they may be integrated into the cover back 502 or the plate 500. In one example implementation, shown in FIG. 7, four spacers 600 are positioned adjacent four hooks 508 and posts 206. The four hooks 508 and corresponding four posts 206 are positioned equidistance around a center circumference of the cover back 502. The four screws 506 and corresponding four spacers 600 are positioned equidistance on the same center circumference and shifted clockwise from the hooks 508 to prevent interference with the posts 206.

Figure 8:
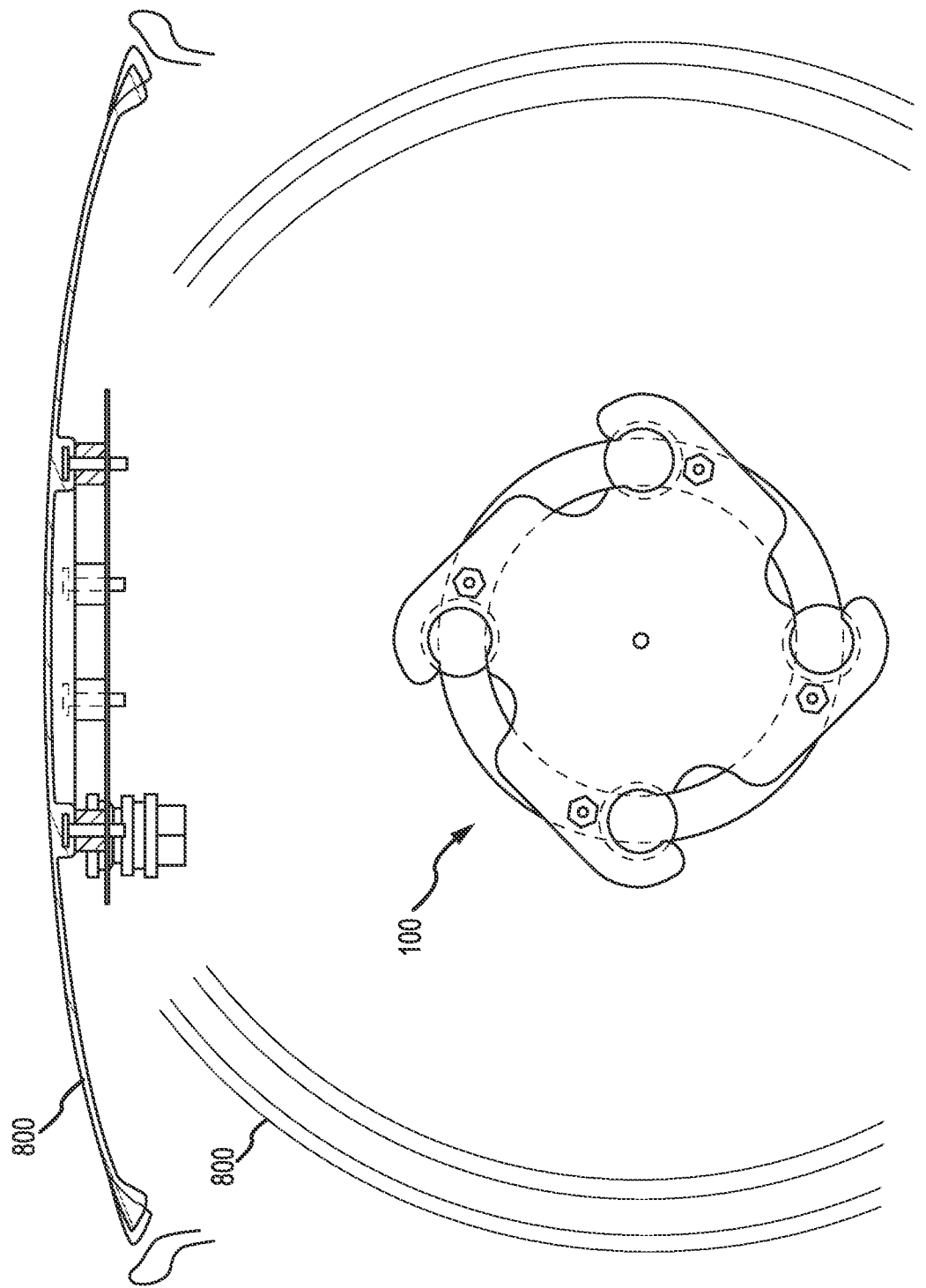
FIG. 8 illustrates an example engagement plate coupled to a wheel cover.
Figure 9A:
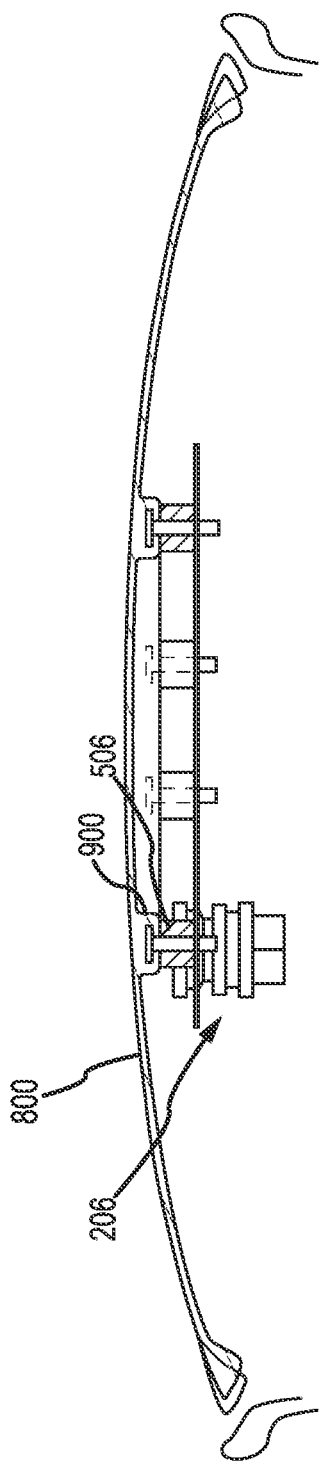
FIGS. 9A-B are a side view and a detailed side view, respectively, of an example wheel cover system.
Figure 9B:
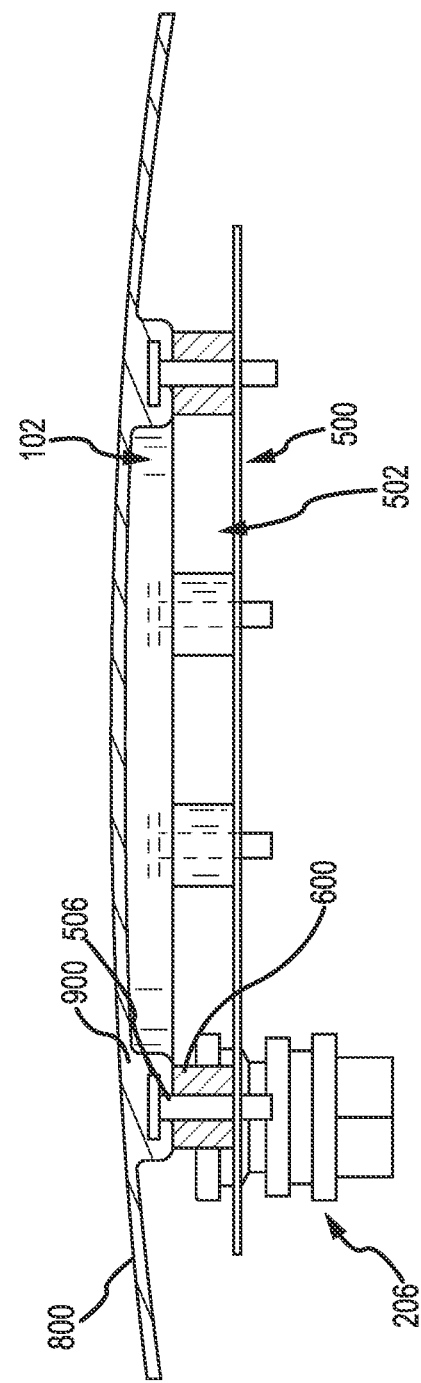

FIG. 8 illustrates a high level view of the wheel cover system 100 with a wheel cover 800. The wheel cover 800 can be disc or domed shaped with various ornamental features and extends over the receiver 104 and plate 500. The wheel cover 800 entirely covers the remainder of the wheel cover system 100 components, such as the receiver 104 and the plate 500, as well as the internal components of the wheel, including the hub 200. The wheel cover 800 may also include a thicker portion on the perimeter of the disc, which may provide more stability at the edge as well as prevent debris from entering the space behind the wheel cover 800. The wheel cover 800 can be coupled to the plate 500 in a variety of ways. In one example, shown in FIGS. 9A-B, the wheel cover 800 includes an attachment portion 900 and an opening where the screw 506 passes through and attaches the wheel cover 800 to the plate 500. FIGS. 9A-B further illustrate the cover assembly 102, complete with the cover 800, mounted to an example post 206 of the receiver 104.

FIGS. 10-14 illustrate an example installation of the cover assembly 102 onto the receiver 104. In one implementation, the cover assembly 102 is positioned over the receiver 104, such that the plate 500 is facing the posts 206. The first groove, or cap receiving area 516, is positioned over the posts 206 and the cover assembly 102 is pushed inwardly in a direction towards the hub 200 and rotated in a first direction, for example, clockwise. The spring bias of the spring 204 causes the cover assembly 102 to jolt outwardly providing positive feedback and locking the cover assembly 102 in place on the posts 206. The cover assembly 102 is thereby preventing from rotating counter-clockwise or clockwise. The only way to remove or release the cover assembly 102 is the application of a force on the cover assembly 102 in direction inwardly towards the hub 200 and rotation of the cover assembly 102 in a second direction opposite the first direction (e.g., counterclockwise). The cover assembly 102 is rotated until disengaged from the posts 206, and the spring bias of the spring 204 translates the cover assembly 102 in a direction outwardly from the hub 200, releasing the cover assembly 102 from the receive 104.

In one implementation, the wheel cover system 100 provides a positive feedback loop to notify a user of proper installation, as the user cannot see the parts during installation due to the wheel cover 800. The feedback loop includes, but is not limited to, audial, tactile, visual, and/or other feedback. The audial feedback may be generated by the plate 500 hitting the first caps of each post 206. The tactile feedback may come in the form of a jolt caused by the spring bias of the spring 204 translating the plate 500 outwards, enabling a user to feel the cover assembly 102 move against his hand. The visual feedback may be provided in how the wheel cover 800 is oriented relative to the wheel.

Figure 10:
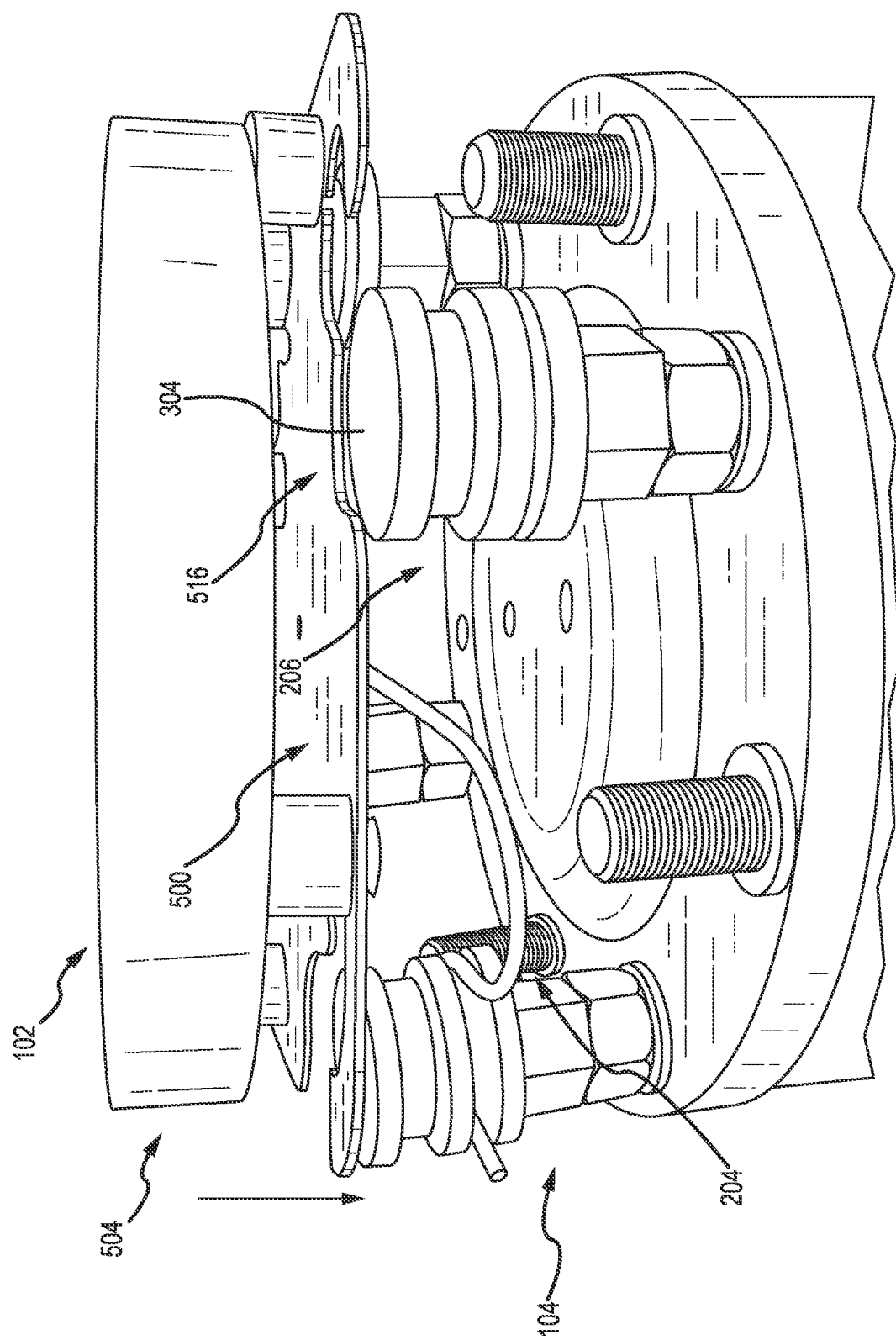
FIGS. 10-14 illustrate example steps for installing a wheel cover to a wheel.

As shown in FIG. 10, in one implementation, the cover assembly 102 is positioned such that the plate 500 is centered on the spring engagement point 400, shown in FIG. 4, and the cover back 502 is facing outwards. The cap receiving area 516 is aligned with the first cap 304. When the cover assembly 102 receives the application of an inward force, for example from a user pushing on the cover assembly 102, the cover assembly 102 compresses the spring 204, and the cover assembly 102 moves inwardly in a direction towards the hub 200, as indicated by the arrow shown in FIG. 10.

Figure 11:
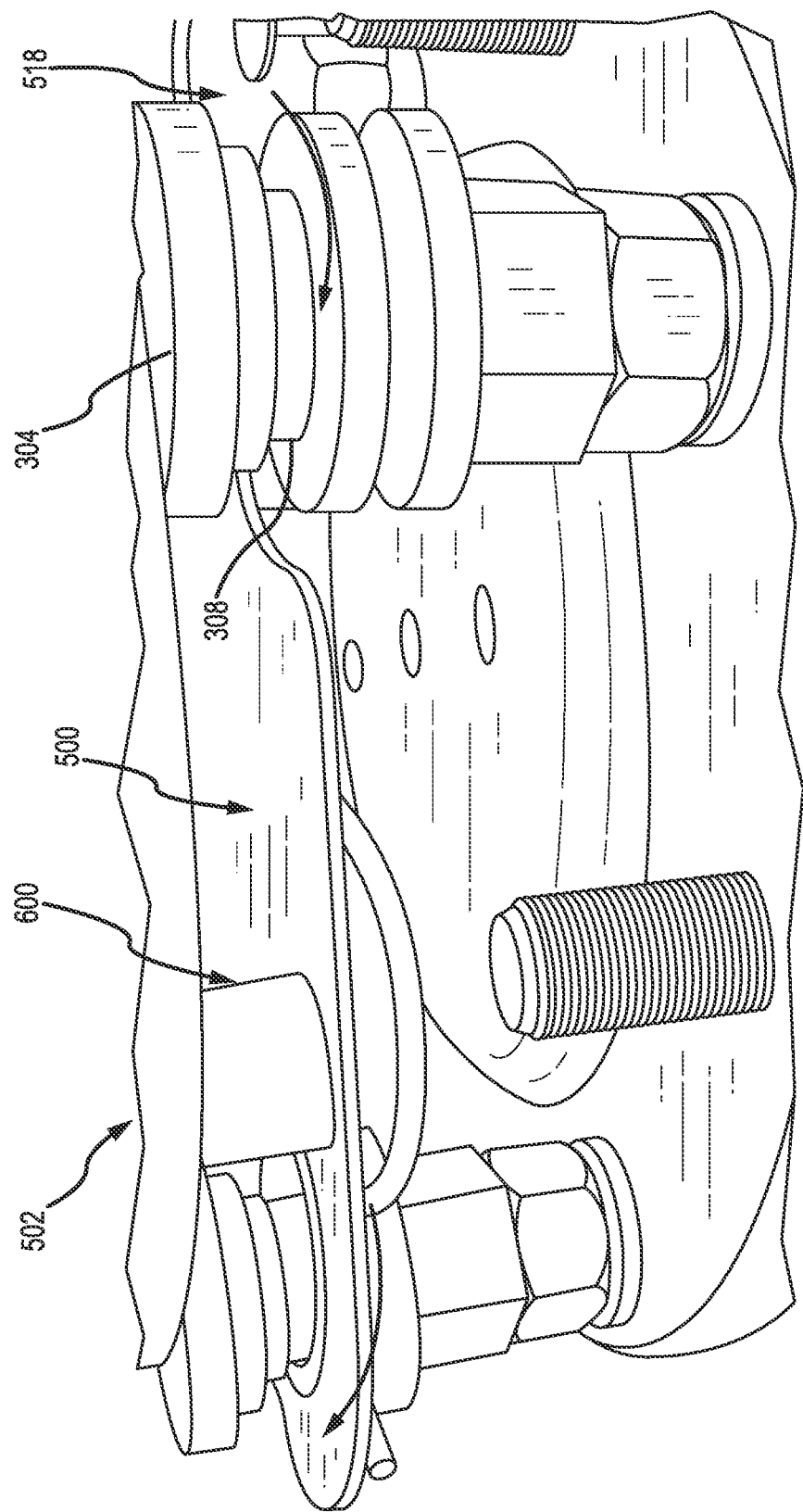

Turning to FIG. 11, after the cover assembly 102 is translated inwardly through the application of the inward force, the first caps 304 abuts the cover back 502, preventing the cover assembly 102 from moving further inward. The spacers 600 distance the cover back 502 and the plate 500 such that the plate 500 is dropped into the same plane as the neck step 308. The spacers 600 and the cover back 502 save time and effort as a user can simply push the cover back 502 until the cover back 502 contacts the first caps 304. The cover assembly 102 is then rotated in the first direction (e.g., clockwise), as shown by the arrows.

Figure 12:
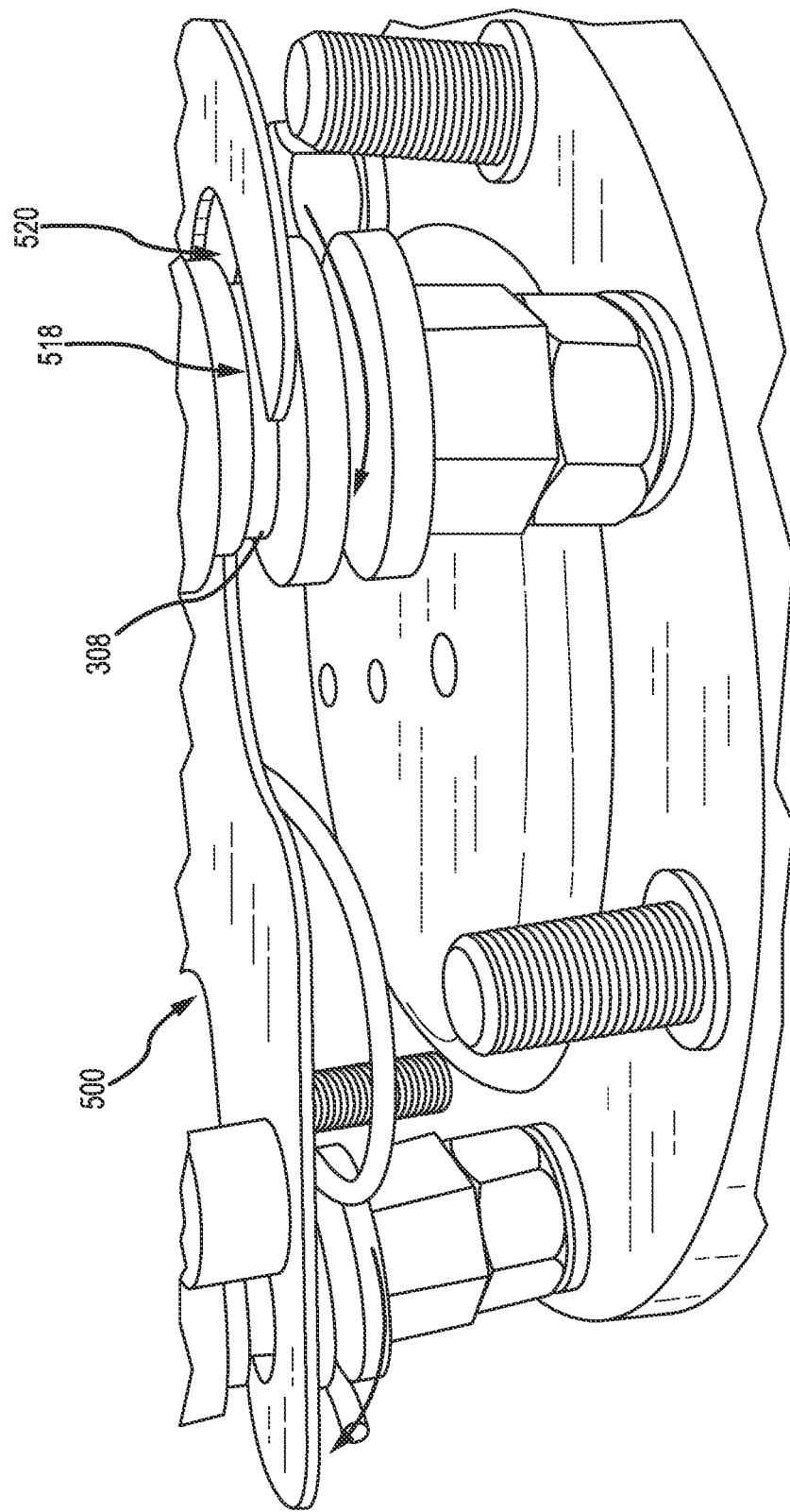
Figure 13:
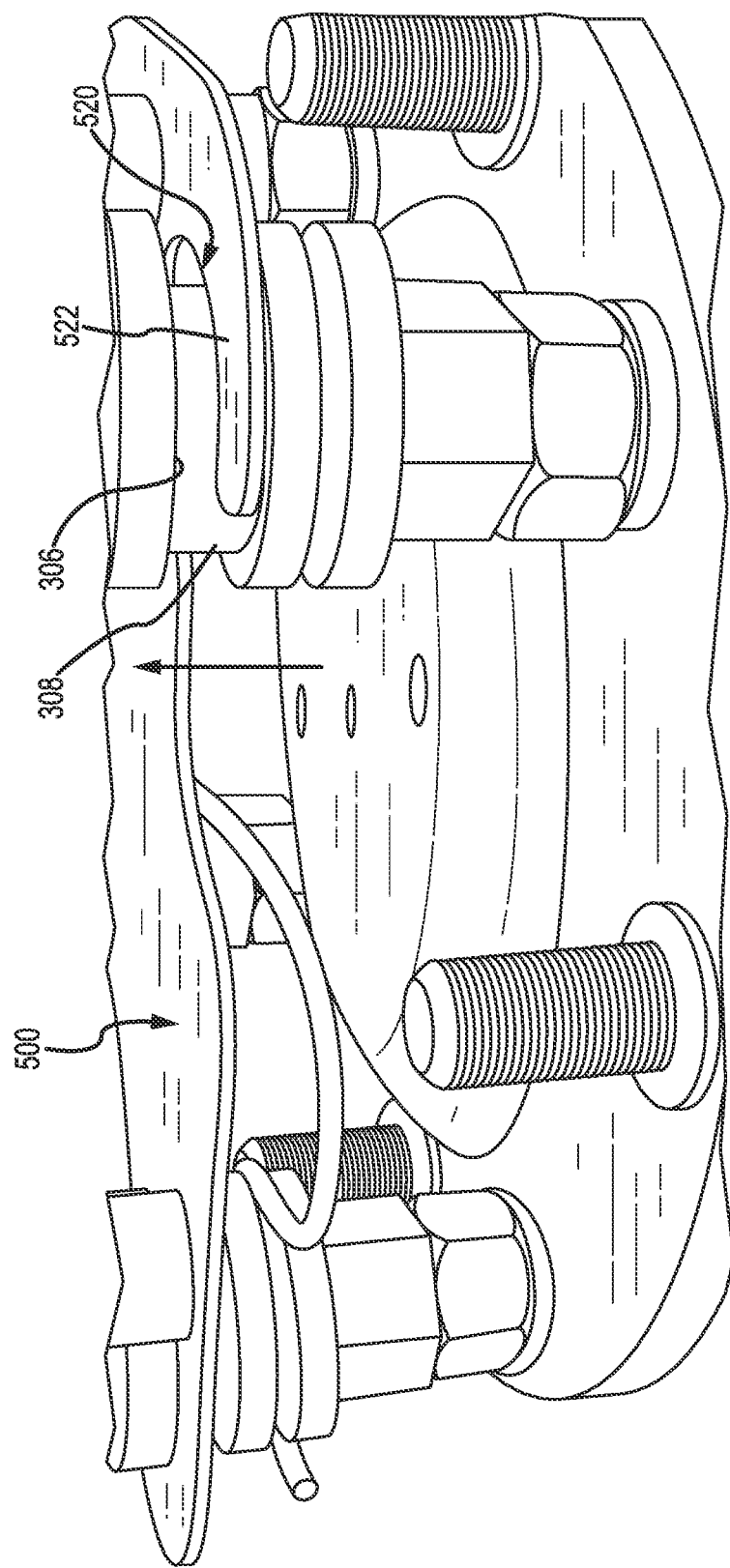

As can be understood from FIG. 12, while the cover assembly 102 is rotating as indicated by the arrow, the neck receiving area 518 receives and guides the neck step 308 into the hook receiving area 520. When the neck step 308 is in the hook receiving area 520, as shown in FIG. 13, the inward force on the cover assembly 102 is desisted, resulting in the spring bias of the spring 204 exerting an outward force against the cover assembly 102 and translating the cover assembly 102 outwards, as shown by the arrow in FIG. 13. In an example implementation, the outward force generated by the spring bias of the spring 204 is approximately 20 lb/inch.

Figure 14:
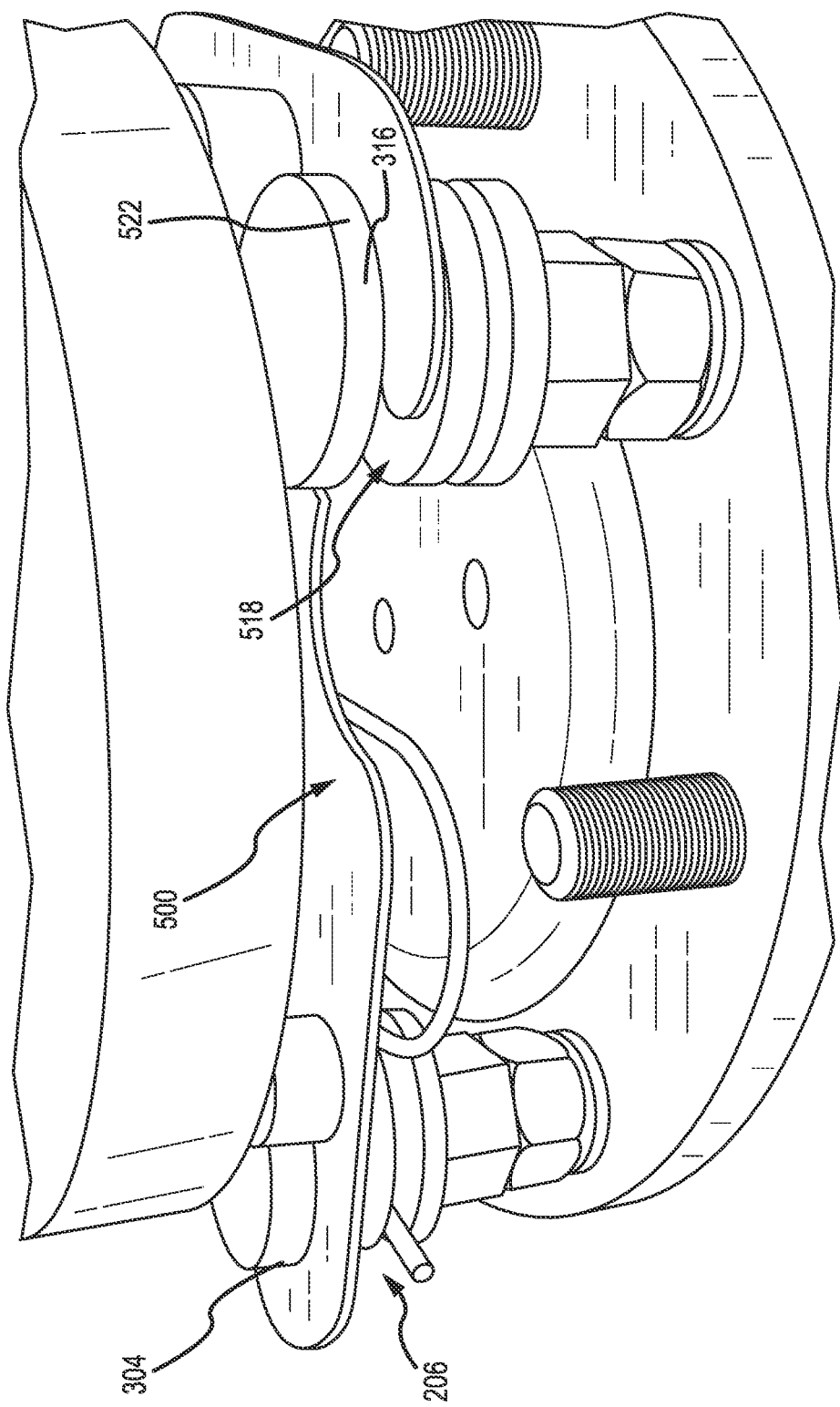

FIG. 14 illustrates the engagement plate 500 engaged to the posts 206. In one implementation, the hook surface 522 is flush against the cap bottom surface 316 and the hook step 306 is positioned in the hook receiving area 520. Because the combination of the width of the neck receiving area 518 being less than the diameter of the hook step 306 and the outward force provided by the spring bias of the spring 204, the hook step 306 cannot rotate out of the hook receiving area 520, thus preventing the plate 500 from rotating. In other words, the circumference of the hook receiving area 520 is about the same as the circumference of the hook step 306, both of which are larger than the distance formed by the neck receiving area 518, thus preventing the plate 500 from rotating. The spring 204 continually exerts an outward positive force against the plate 500, which together with the first caps 304, translationally and rotationally lock the plate 500. In other words, the circumference of the engaging plate 500 in the secondary or locking position of the plate 500, when displaced outwards with the force of the spring 204, is dimensioned such that the plate 500 cannot rotate as it is more than half of the diameter of the stud step with which it engages. Furthermore, if the cover assembly 102 is secured on at least one post 206, the surface 316 is engaging the entire post 206. One post 206 can provide sufficient engagement area to hold the cover assembly 102 in position.

Figure 15:
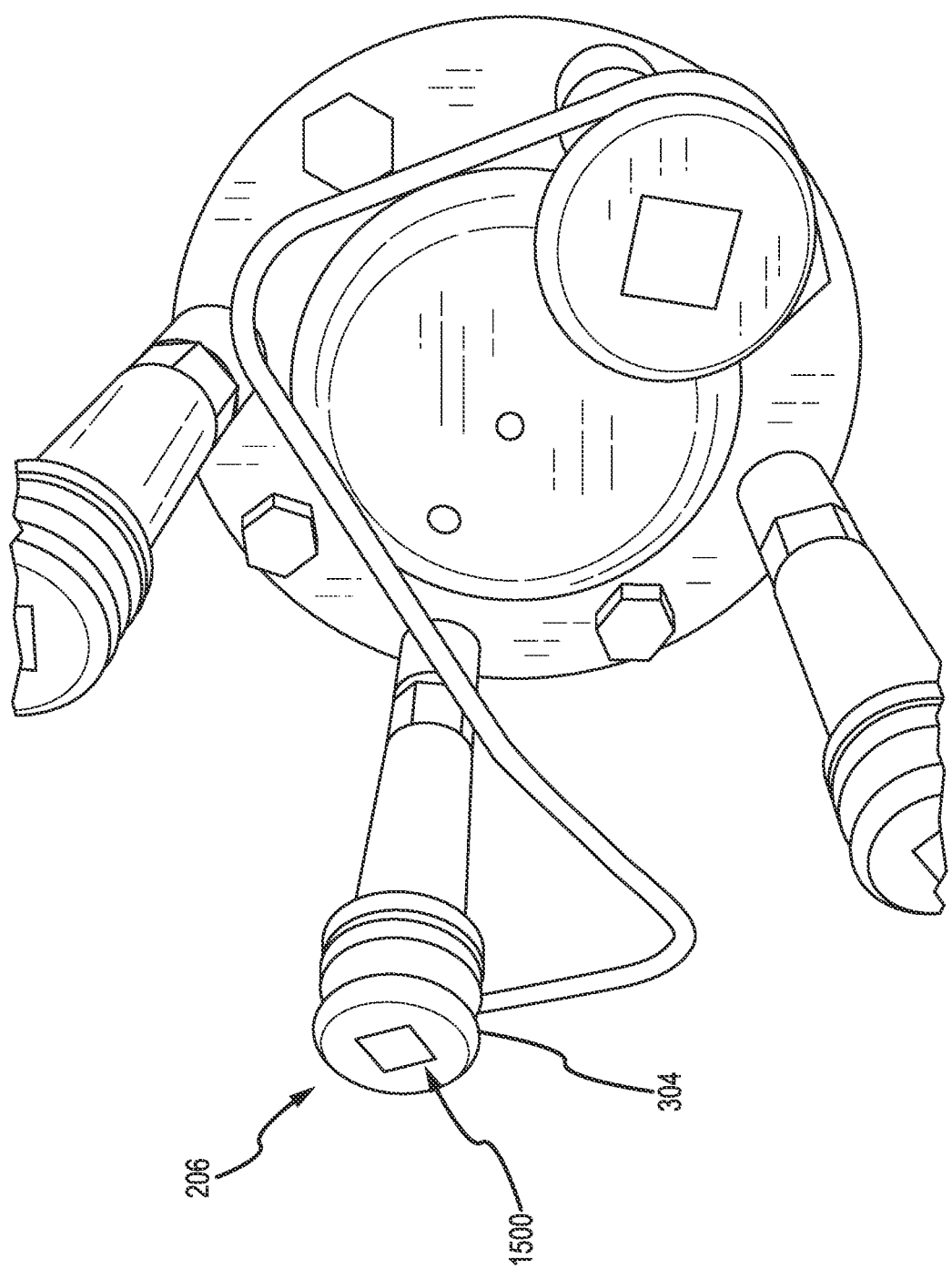
FIG. 15 is an example post of a receiver having a square drive.

The various implementations described herein may have several additional features. For example, FIG. 15 illustrates the post 206 having a driver opening 1500 extending into the first cap 304. The driver opening 1500 is configured to receive a driver tool, such as a screw driver, for example, to drive the post 206 into the hub 200. The driver 1500 may be shaped to be a hex, Phillips, slot, triangle, or the like. In an example implementation, the driver 1500 is a half-inch square driver. The driver 1500 provides an alternatives means to couple the post 206 to the hub and utilizes a driver instead of a wrench, for example.

Figure 16:
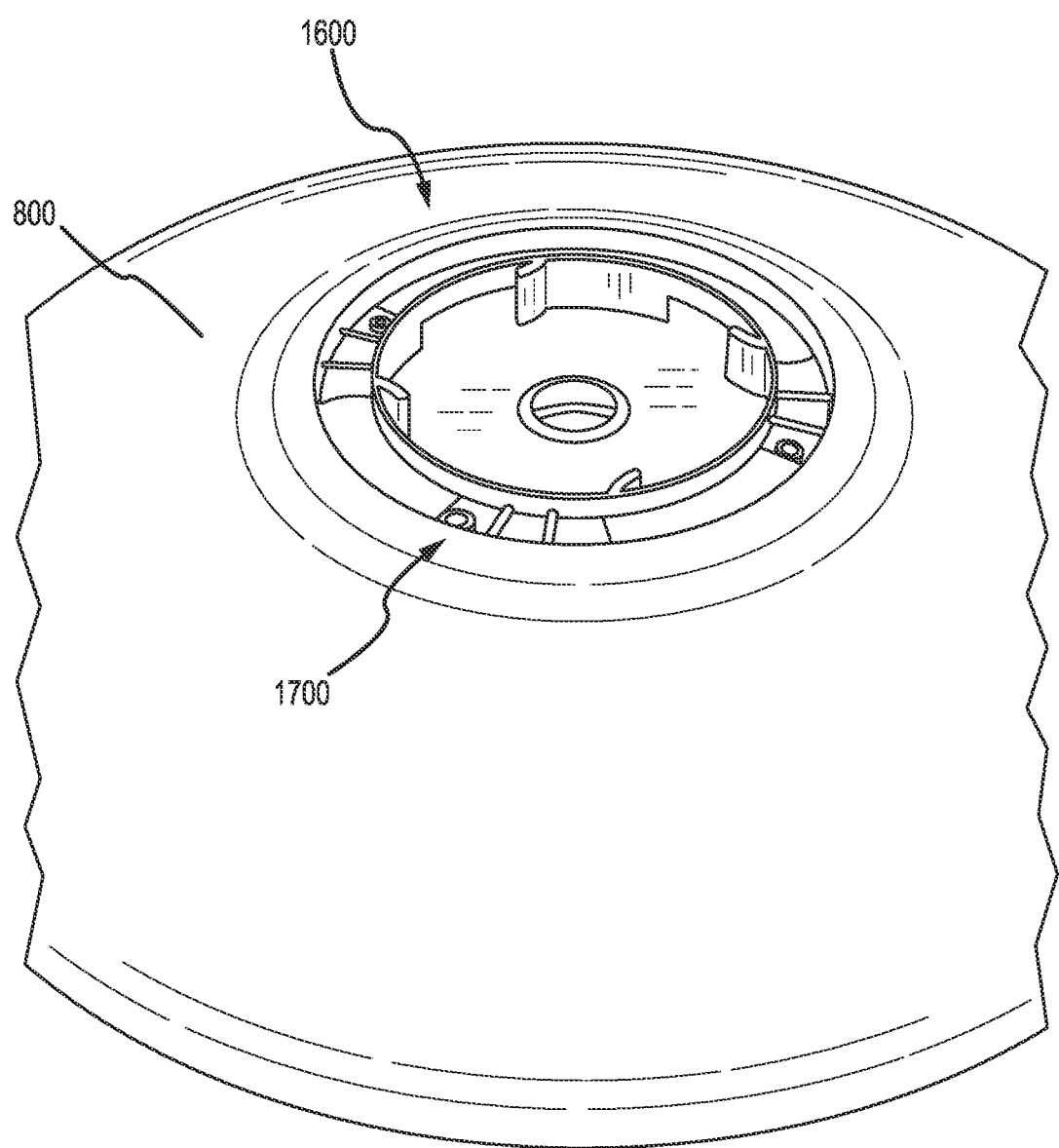
FIG. 16 is a top perspective view of an example wheel cover for rear wheels on a vehicle with a cover cap removed.
Figure 17A:
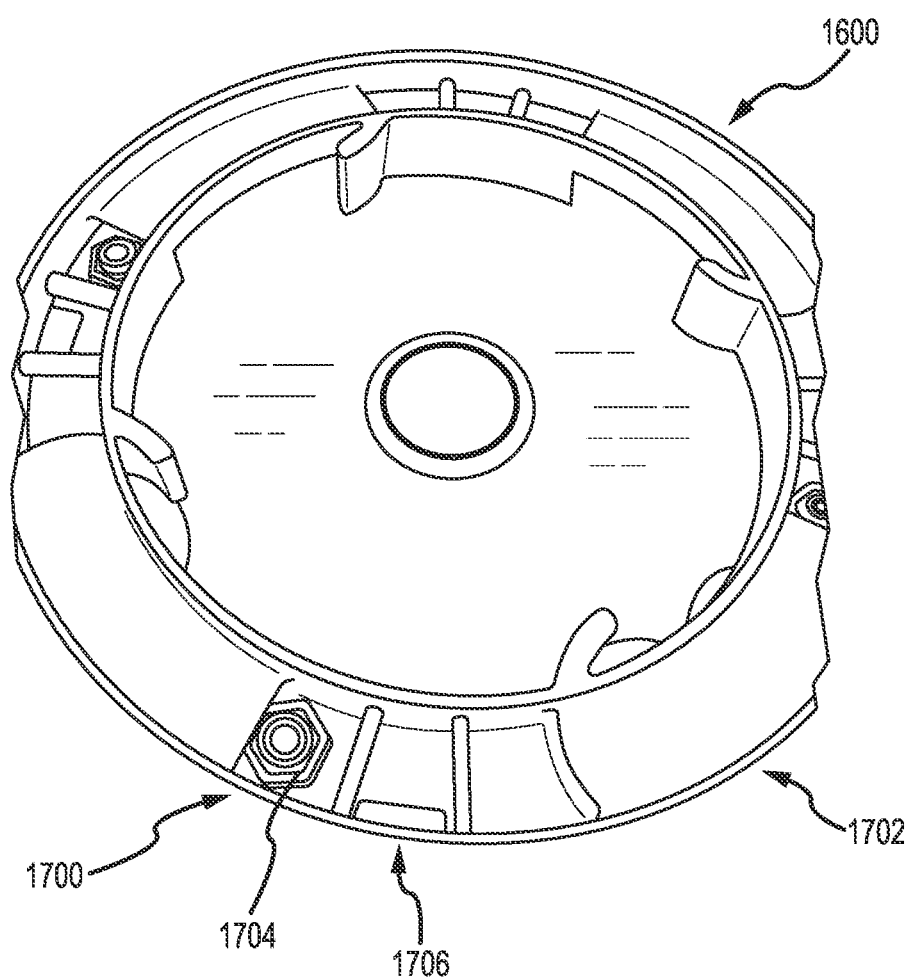
FIGS. 17A-B are detailed views of a cover cap receiver and a cover cap, respectively.

Furthermore, the wheel cover 800 may also have additional features. FIG. 16 illustrates the wheel cover 800 having a center opening 1600 accommodating a plurality of couplers 1700, shown in detail in FIG. 17A. The plurality of couplers 1700 are configured to couple the wheel cover 800 to the plate 500. In an example implementation, shown in FIG. 17A, the center opening 1600 includes an indented ring 1702 broken into four sections by the plurality of couplers 1700, wherein the plurality of couplers 1700 are have an opening sized for a screw thread to past through. The plurality of screws 1704 couple the wheel cover 800 to the plate 500. It will be appreciated that the wheel cover 800 can be coupled to the plate 500 in other ways, including, but not limited to, using adhesion, welding, rivets, or the like. Further, the wheel cover 800 and the plate 500 can be one unitary piece.

Figure 17B:
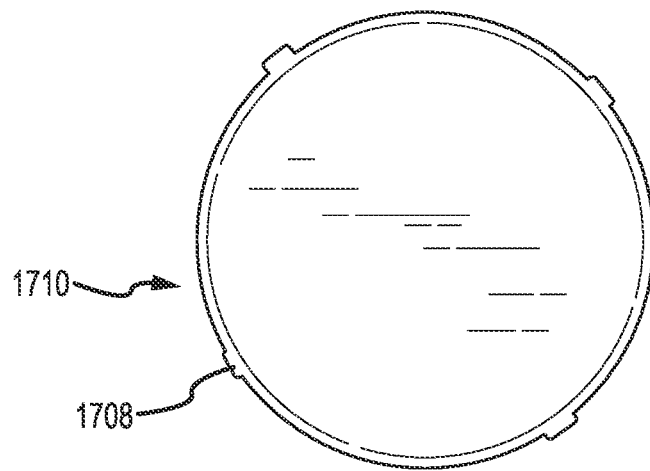
Figure 18:
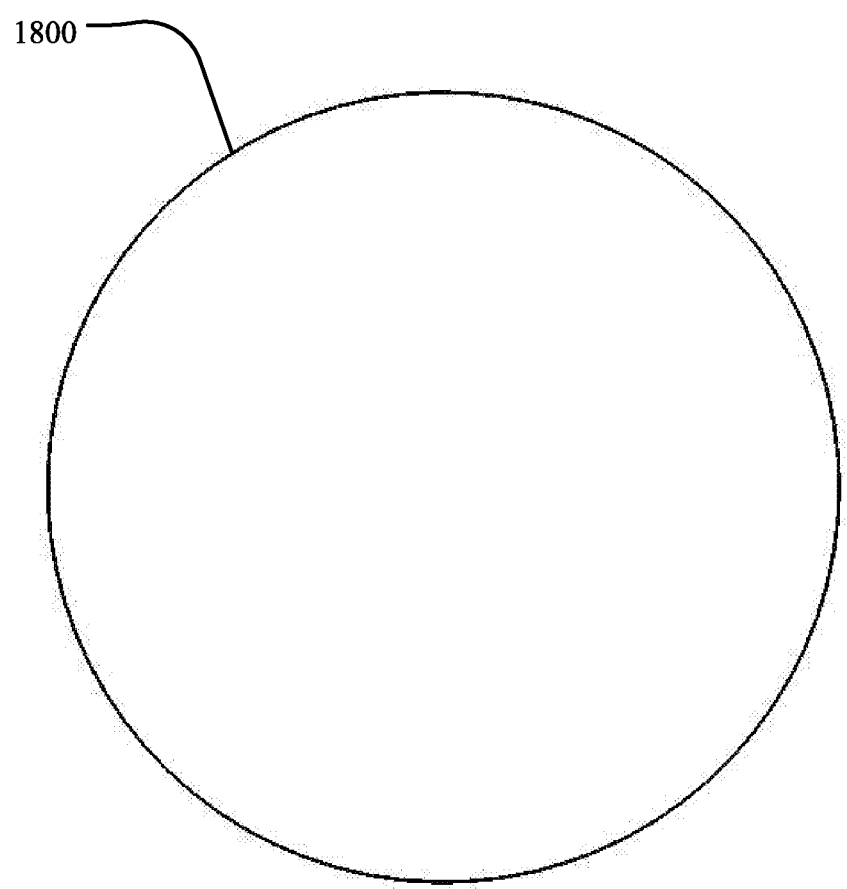
FIG. 18 is a top view of an example integrated wheel cover.

The indented ring 1702 may also be separated into sections by a plurality of cover cap receivers 1706 adjacent to each plurality of couplers 1700. The plurality of cover cap receivers 1706 are configured to receive a cover cap tab 1708, shown in FIG. 17B, of a cover cap 1710. In an example implementation, each cover cap receiver 1706 is a slotted opening configured to receive each cover cap tab 1708. The cover cap receivers 1706 and cover cap tabs 1708 lock the cover cap 1710 to the wheel cover 800 via a snap fit. It will be appreciated that the cover cap 1710 may be attached via other mechanical mechanisms or integrated into the wheel cover 800, such that the cover cap 1710 and the wheel cover 800 are one piece. In one example, shown in FIG. 18, the cover 1800 is one integrated piece. Furthermore, the cover cap 1710, wheel cover 800, and the plate 500 may be one piece as well.

In one implementation, the cover cap 1710 encloses the center opening 1600, creating an aerodynamic smooth and clean surface on the wheel cover 800. The wheel cover 800 or integrated cover 1800 may be covered in a wrap to display an image or have an unobstructed communicative display. The wheel cover 800 or integrated cover 1800 may also have different finishes such as smooth, corrugated, completely clear, or the like, along with other ornamental features. The wheel cover 800 completely seals and hides the remainder of the wheel cover system 100 and the inner wheel components, including the hub 200, from view, while providing protection from dirt and debris.

Figure 20:
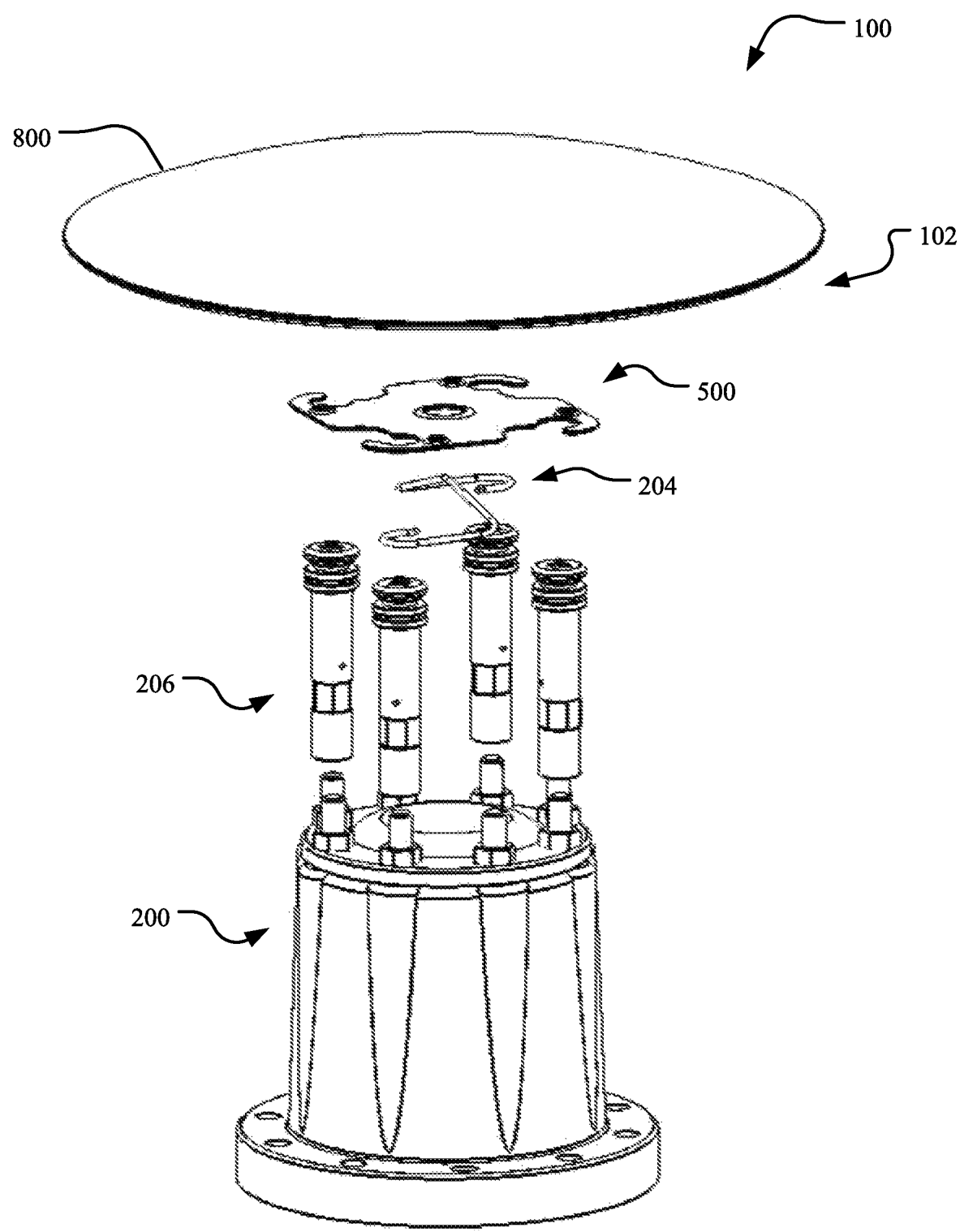
FIG. 20 is an exploded view of an example wheel cover system for a rear wheel of a vehicle.

For an example of the wheel cover system 100 configured for mounting to a rear wheel of a vehicle, reference is made to FIGS. 19A-20. In one implementation, the plate 500 attaches to a plate receiver 1900 via screws, adhesion, rivets, or the like. Raised portions of the plate receiver 1900 can be seen in FIG. 19B. In one implementation, the plate 500 is screwed into the plate receiver 1900 with a plurality of screws that screw into a plurality of threaded openings 1902 in the plate receiver 1900. Each of a plurality of curved flanges 1904 follows a portion of the perimeter of each cap receiving area 516, as shown in FIG. 19C, which allows the cap 304 of the post 206 to pass through the cap receiving area 516.

In the example shown in FIG. 20, a standard 8 bolt hub assembly is shown with 8 studs 202 extending outwardly from the hub 200. Four long posts 322 will be engaged to every other stud 202, such that a free stud 202 is positioned between each post 322. More or less than four posts 322 may be used and the posts 322 may be installed with any pattern, such as all four posts 322 adjacent to each other, two posts 322 adjacent to each other, or the like. As previously mentioned, an adhesive, such as Loctite, or other attachment mechanism may be used to secure the posts 322 onto the studs 202. The spring 204 is then installed onto two posts 322. The plate 500 may be attached to the wheel cover 800 or integrated into the wheel cover 800 as one piece. The cover assembly 102 may then be removably installed onto the posts 322.

FIGS. 21-29C illustrate an example of the wheel cover system 100 configured for mounting to a front wheel of a vehicle. Contrary to a rear wheel, a standard front axle may include 10 lug nuts deeply recessed within the wheel. To account for these differences, in one implementation, the wheel cover system 100 includes the plurality of posts 206 with the short profile 320, the spring 204 with a plurality of limbs, and a modified plate 500 and wheel cover 800.

Figure 22:
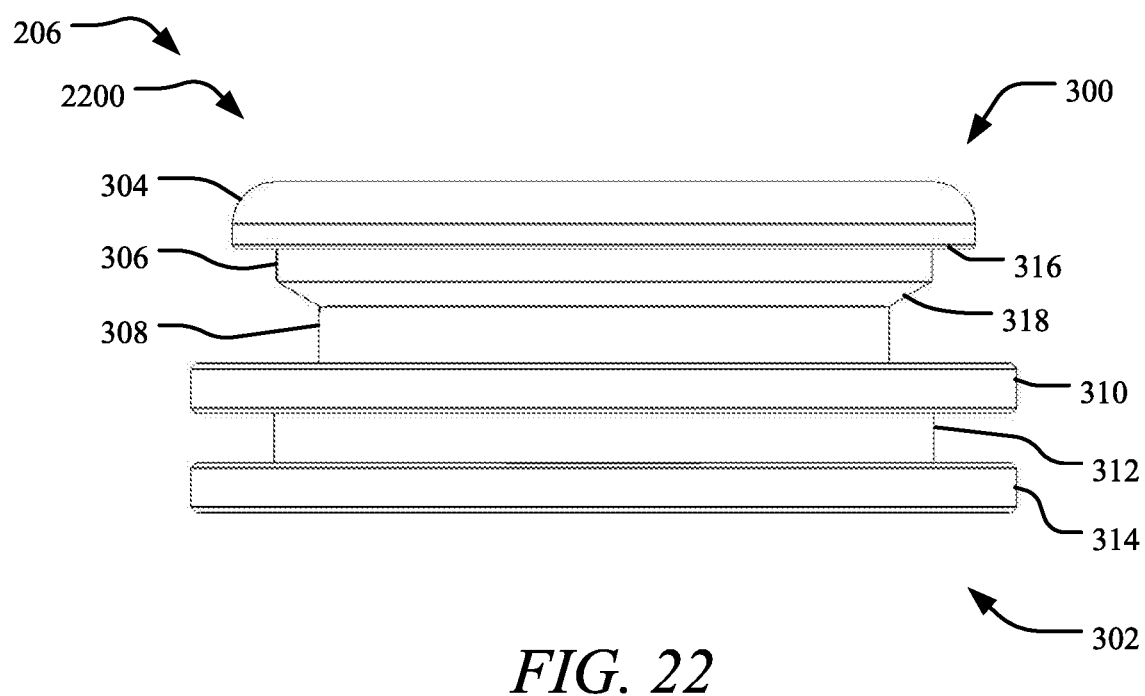
FIG. 22 is a side view of an example post for the wheel cover system of FIG. 21.
Figure 23A:
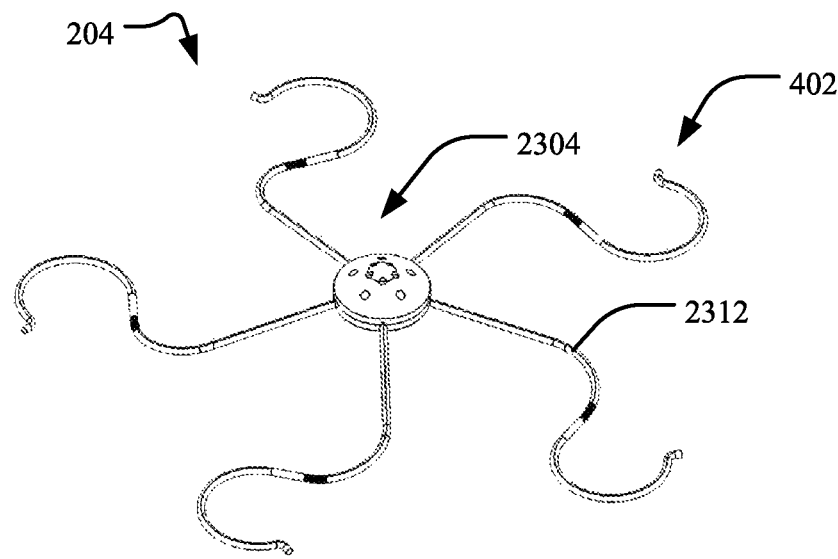
FIGS. 23A-24B are an isometric view, an exploded isometric view, a side view, and a top view, respectively, of a spring assembly for the wheel cover system of FIG. 21.
Figure 23B:
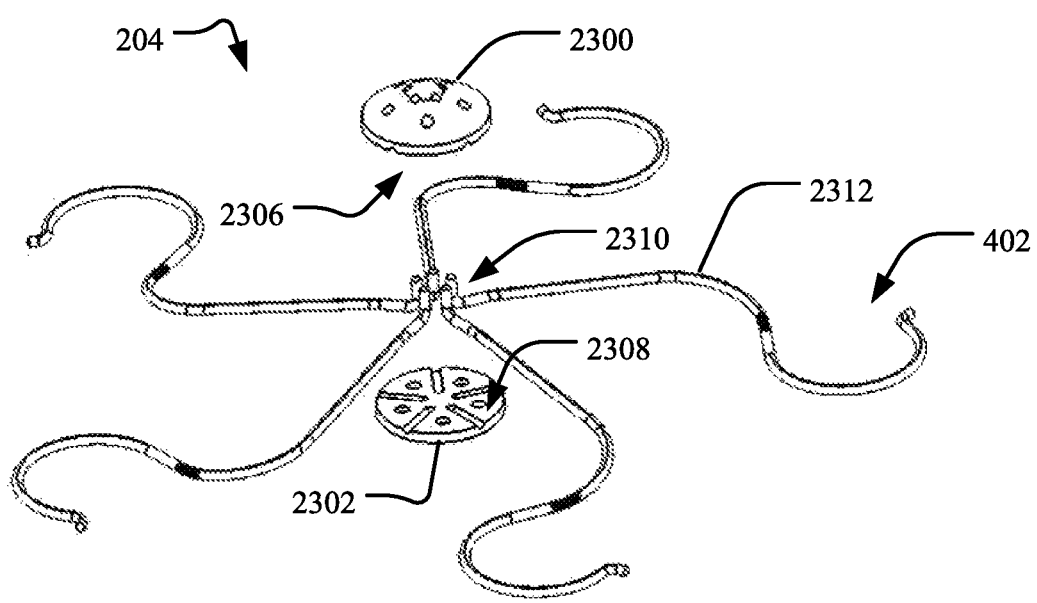
Figure 24A:
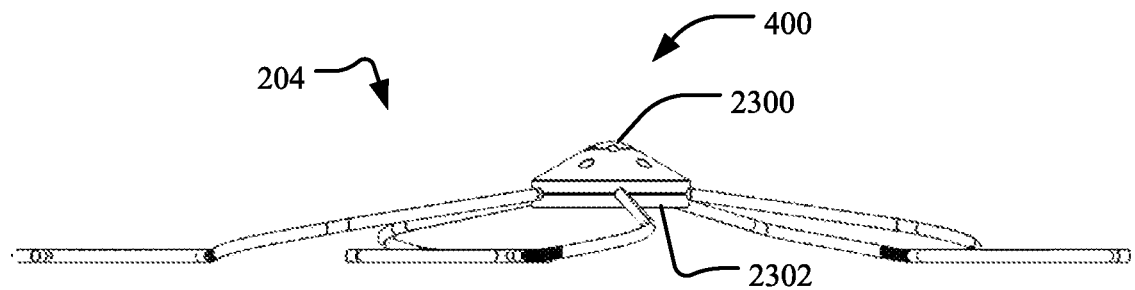
Figure 24B:
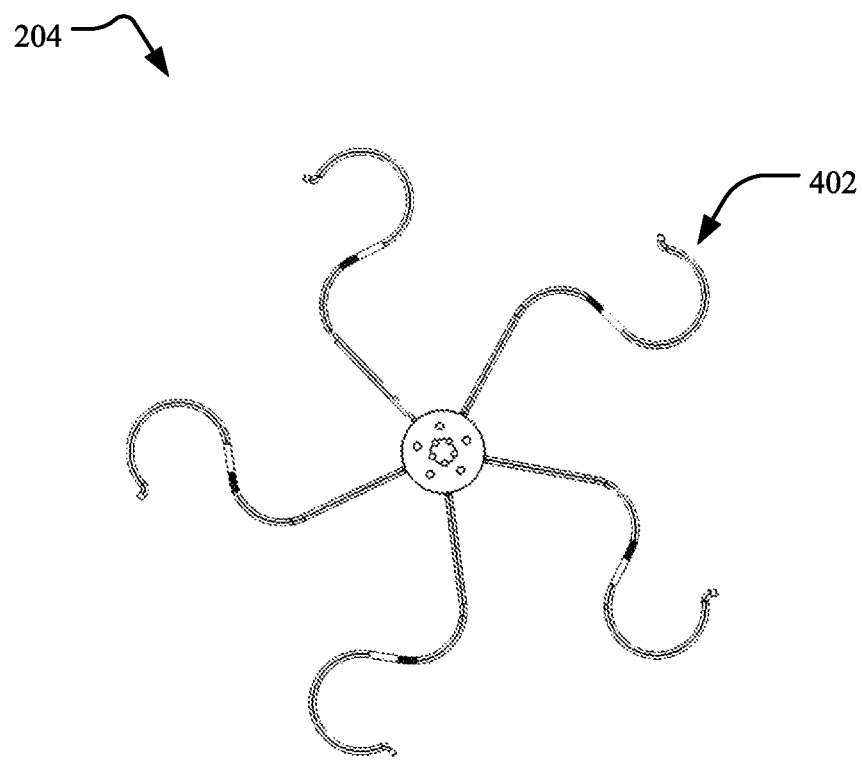
Figure 25A:
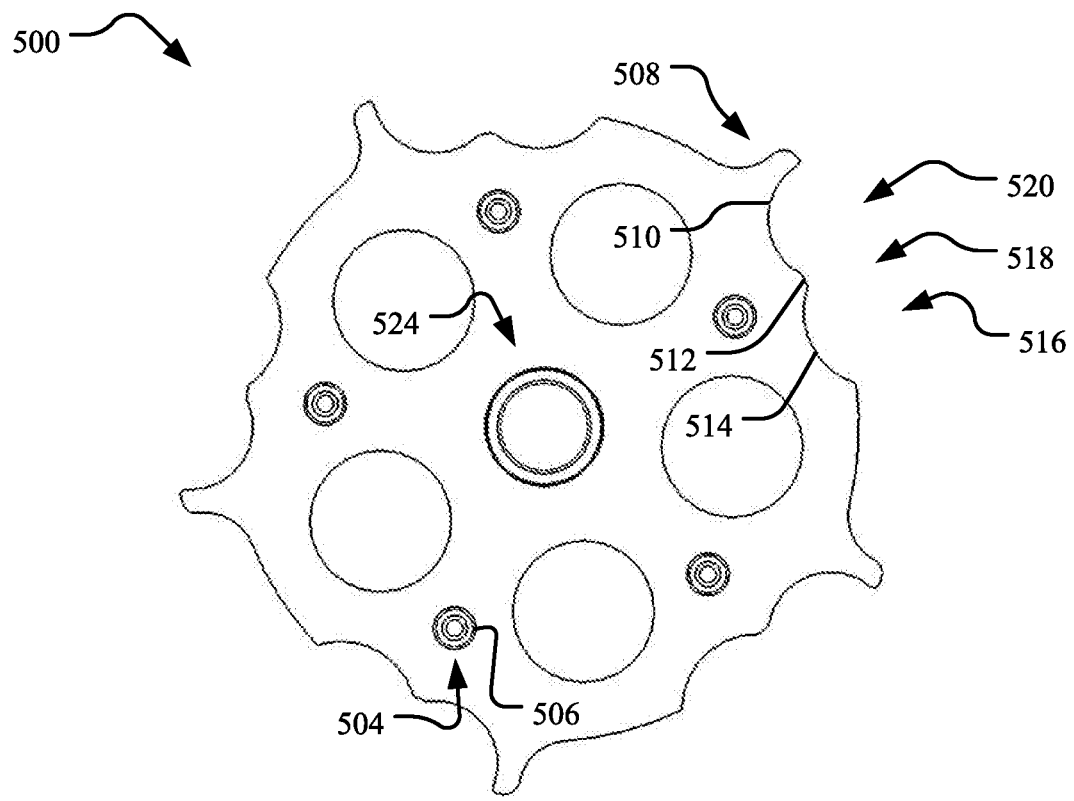
FIGS. 25A-25B are a top view and an isometric view, respectively, of an example engagement plate for the wheel cover system of FIG. 21.
Figure 25B:
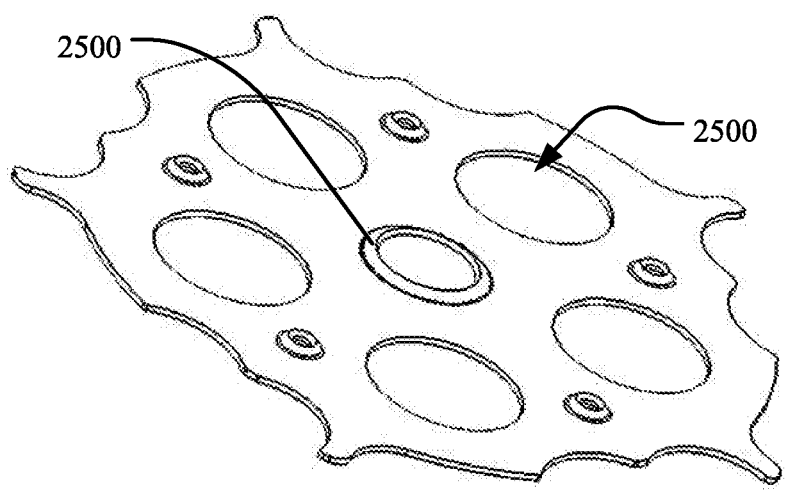
Figure 26A:
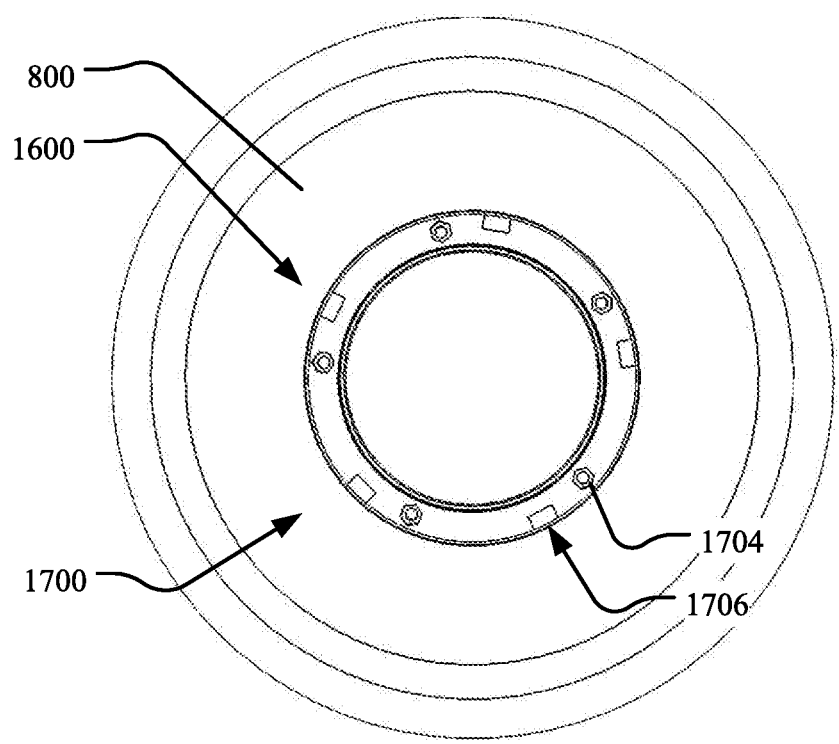
FIGS. 26A-28B are a top view, a top isometric view, a bottom view, a bottom isometric view, a side view, and a bottom isometric transparent view, respectively, of an example wheel cover for the wheel cover system of FIG. 21.
Figure 26B:
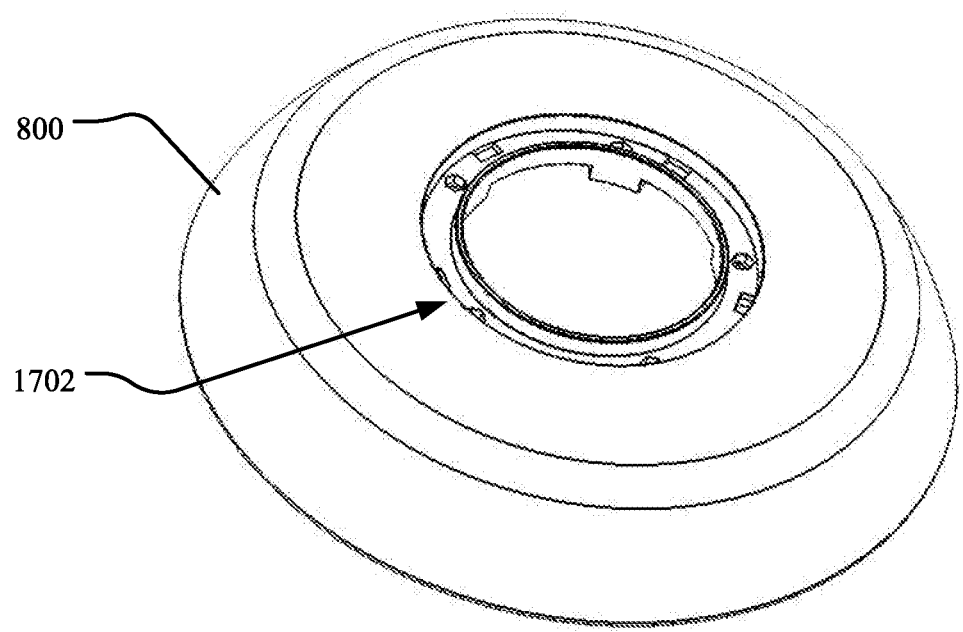
Figure 27A:
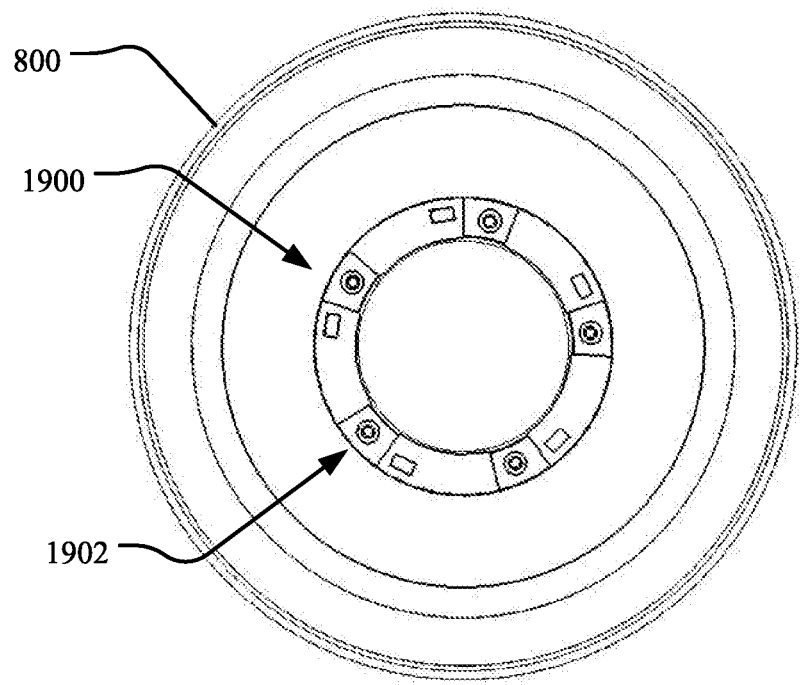
Figure 27B:
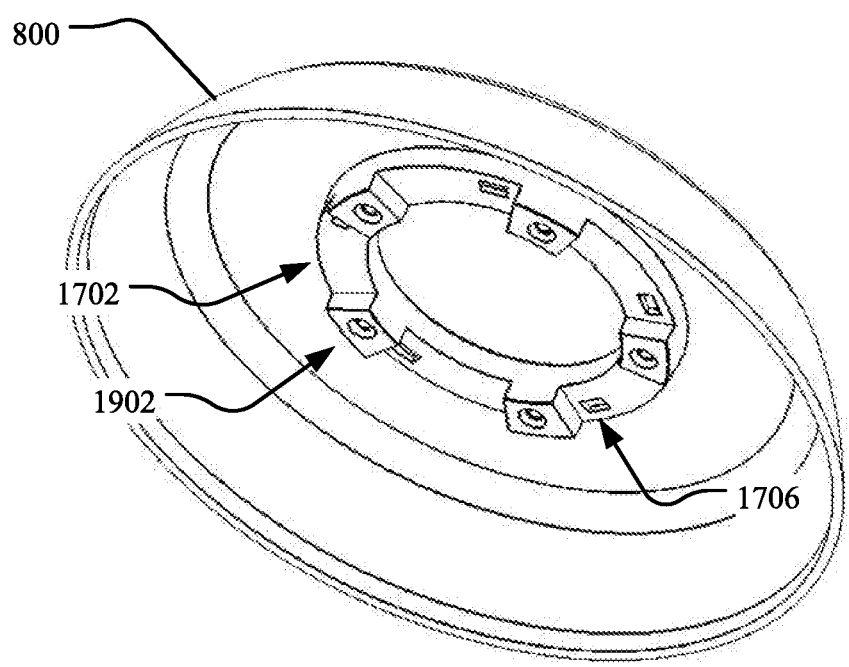

As shown in FIG. 22, in one implementation, each of the posts 206 has a first cap 304 disposed on an upper portion 300 of the post and a second cap 310 and a third cap 314 to frame a spring step 312. Each of the plurality of posts 206 may have a threaded opening on the lower portion 302 configured to receive a lug nut of the wheel, which allows the post 206 to screw onto the lug nut. In one example implementation, five posts 206 are screwed onto the lug nuts of a front axle. The plurality of posts 206 are configured to receive and hold the multi-limb spring 204.

Referring to FIGS. 23A-B and FIGS. 24A-B, in one implementation, the spring 204 includes a plurality of spring limbs 2312 each extending from a spring cap 2304 and having the spring hook 402. The amount of spring limbs 2312 and spring hooks 402 depends on the amount of lug nuts of the wheel. In one example implementation, the spring 204 has five spring limbs 2312 extending from the spring cap 2304. Each of the spring hooks 402 is configured to couple the spring 204 to the plurality of posts 206. The spring cap 2304 includes a spring cap hood 2300 and a spring cap base 2302. The spring cap hood 2300 has a plurality of grooves 2306 configured to receive an end 2310 of each spring limb 2312 opposite another end having the spring hook 402. Similarly, the spring cap base 2302 includes a second plurality of grooves 2308 configured to receive the end of each spring limb 2312. The spring cap hood 2300 and the spring cap base 2302 can be coupled to each other via adhesion, screws, rivets, snap-fit, welding, or the like. The spring cap 2304 may double as the spring engagement point 400 and a known point of contact during installation in the feedback loop. A contour 2500 of the plate 500, shown in FIGS. 25A-B can receive the spring engagement point 400, allowing a user to feel that the wheel cover 800 is centered.

In one implementation, the plate 500 includes radius cuts of different diameters to engage the steps having different diameters in the plurality of posts 206. In other words, the plate 500 positively engages the plurality of posts 206 by a precise mating of the radiused plate 500 to the radiused plurality of posts 206. The plate 500 includes a body with a plurality of hooks 508 having a hook receiving area 520, neck receiving area 518, and a cap receiving area 516. The plate 500 may also include a plurality of openings 2500 to reduce weight and material. In one example implementation, the plate 500 has five hooks 508 protruding from the circumference of the body of the plate 500. The plate 500 may also have five openings 504 and five corresponding screws 506.

Turning to FIGS. 26-29C, in one implementation, the wheel cover 800 includes a center opening 1600 and a plurality of couplers 1700 configured to receive the plate 500. The wheel cover 800 may also include a plurality of cap cover receivers 1706 configured to receive a plurality of cover cap tabs 1708, shown in FIGS. 29A-C. The plurality of couplers 1700 and the plurality of cap cover receivers 1706 are positioned in an indented ring 1702, shown more clearly in FIG. 26B. Turning to a bottom view of the alternative wheel cover 800, reference is made to FIGS. 27A-B.

The bottom portion of the wheel cover 800 includes a plate receiver 1900 having a plurality of threaded openings 1902 configured to receive a plurality of screws 1704. The plurality of threaded openings 1902 protrude from the indented ring 1702 and may provide further clearance for the plate 500 to couple to the wheel cover 800. The plate 500 and the wheel cover 800 may be coupled to each other by adhesion, screws, rivets, snap and fit, or the like. The plate 500 and the wheel cover 800 can also be one unit and manufactured via injection molding or machining, for example.

Figure 28A:
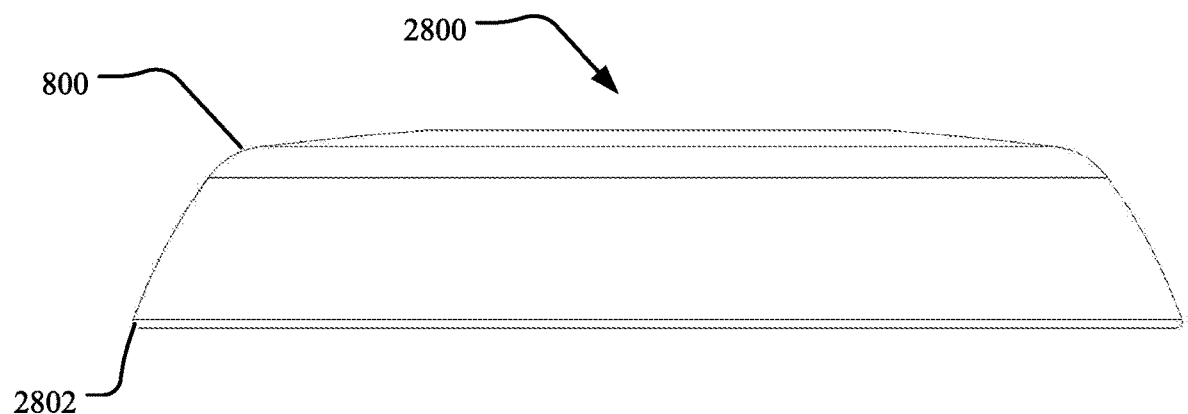
Figure 28B:
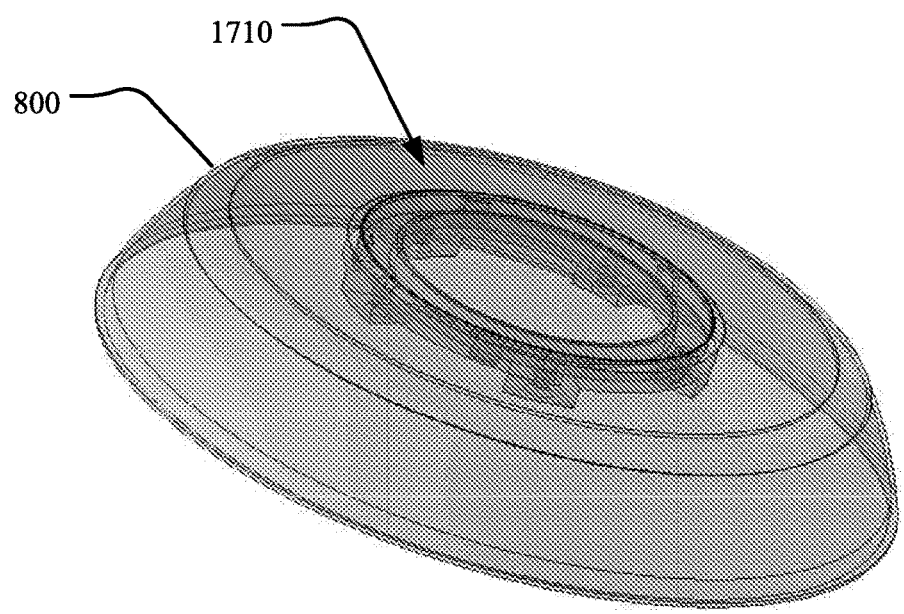

As illustrated in FIG. 28A, in one implementation, the wheel cover 800 includes a planar surface about a center portion 2800 and a side surface that angles in a direction radially outwardly from the center 2800 slopes away from the planar surface towards an edge 2802. The wheel cover 800 can be various shapes with a variety of ornamental features. The wheel cover 800 can be injection molded and the edges can be ground. The center opening 1600 can be covered with a cover cap 1710 to provide a smooth exterior surface. The cover cap 1710, shown in more detail in FIGS. 29A-C, is generally circular shaped with a slight doming near the center. The cover cap 1710 includes a plurality of cover cap tabs 1708 for removably engaging the wheel cover 800 to cover the center opening 1600, as described herein. In one implementation, the cover cap 1710 has five cover cap tabs 1708. The cover cap 1710 is removable from the wheel cover 800, permitting routine inspection and maintenance of the inner components of the wheel and wheel cover system 100 without removing the wheel cover 800.

Figure 21:
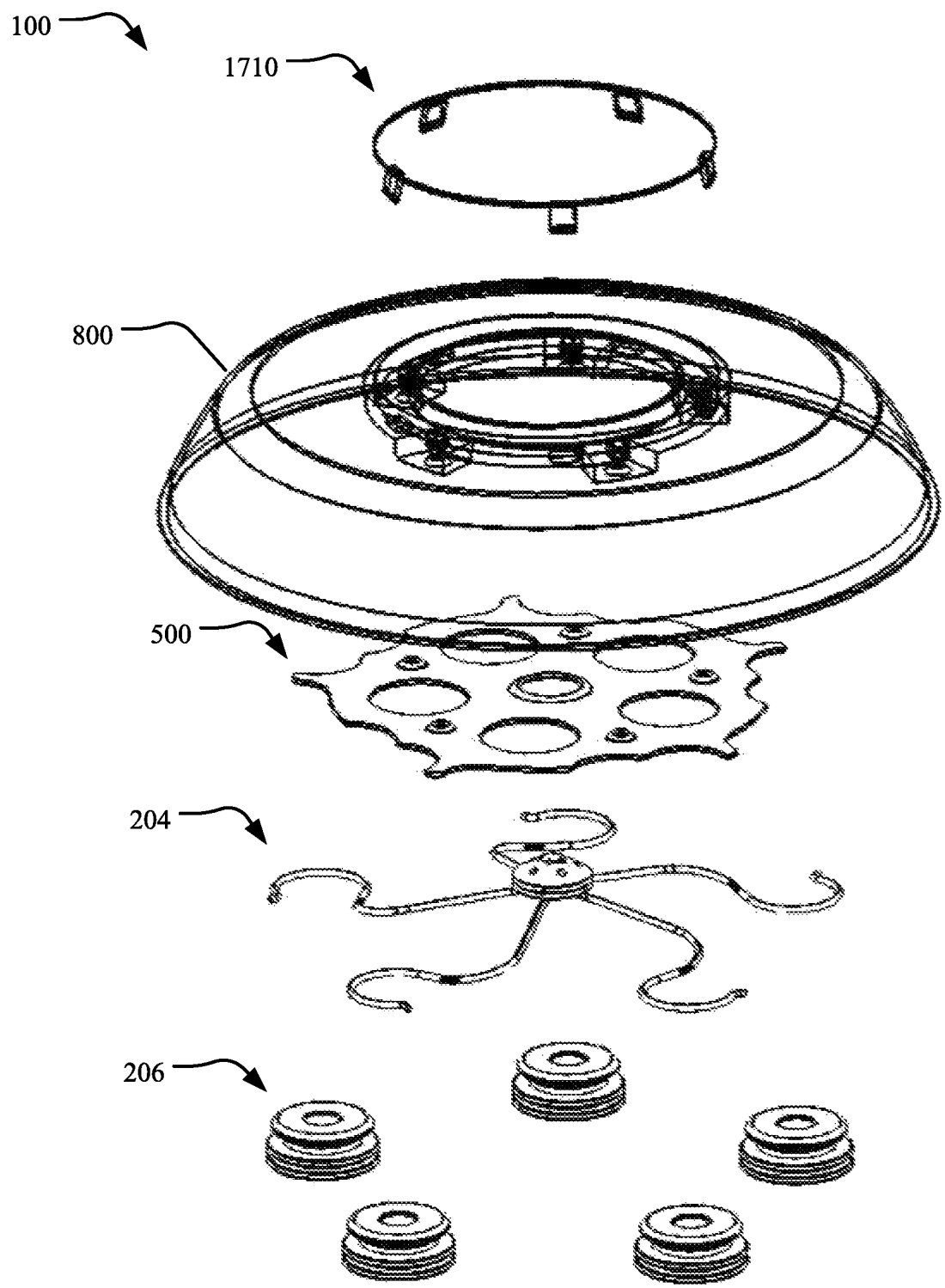
FIG. 21 is an exploded view of an example wheel cover system for a front wheel of a vehicle.

As illustrated in FIG. 21, the cover cap 1710 may snap onto the center opening of the wheel cover 800. The plate 500 can be screwed onto the bottom of the wheel cover 800, which together makes up the wheel cover assembly 102. In one example, five alternative posts 206 can be screwed onto five alternating lug nuts of a front axle. The spring 204 having five spring limbs 2312 can be mounted onto the posts 206, which together makes up the receiver 104. The wheel cover assembly 102 can then be installed onto the receiver 104 as described herein.

Figure 30:
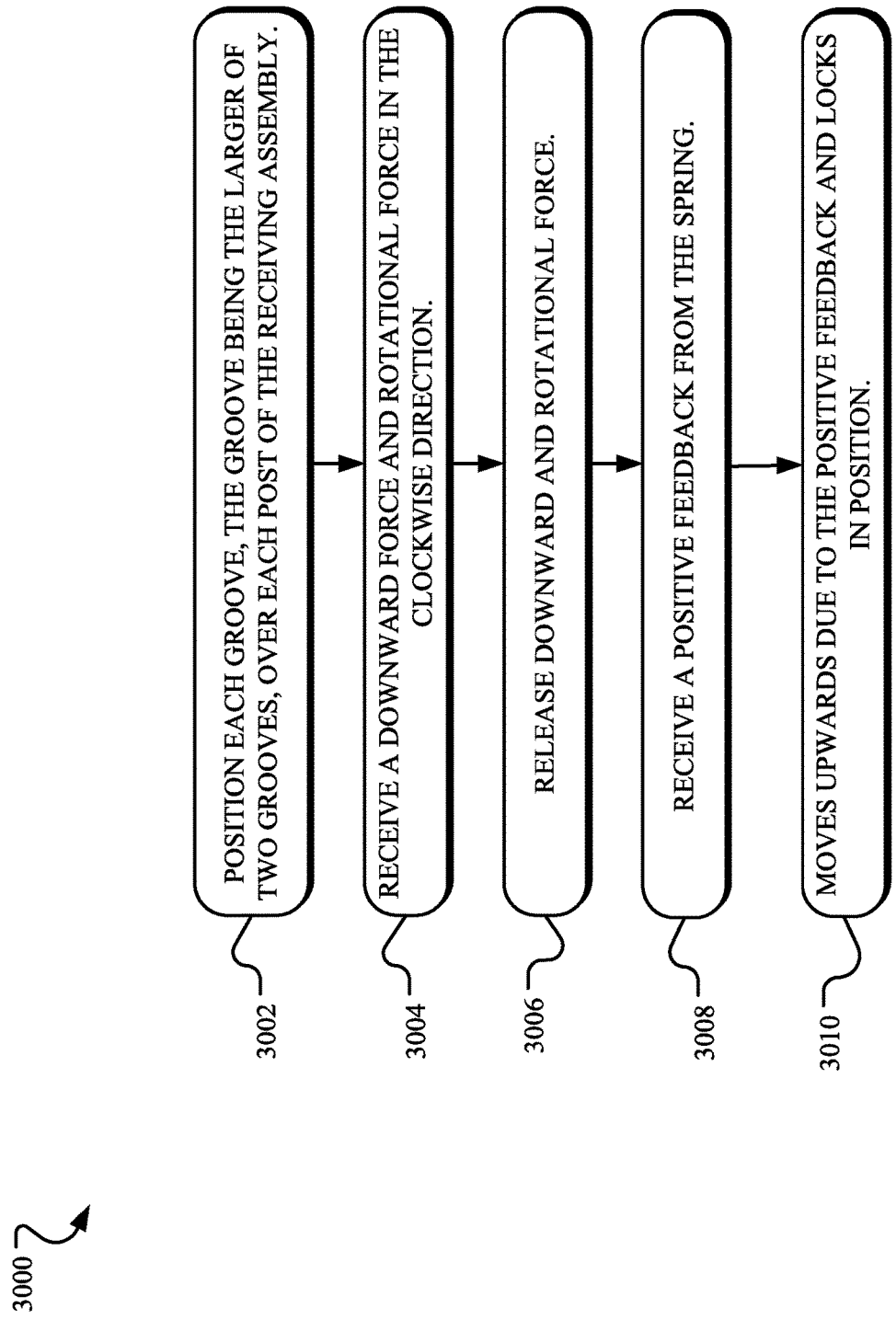
FIG. 30 illustrates example operations for installing a wheel cover assembly onto a receiver.

FIG. 30 illustrates example operations 3000 for installing a wheel cover assembly onto a receiver. An operation 3002 positions a hook of an engagement plate of a cover assembly over a post of the receiver. An operation 3004 receives an inward force overcoming a spring bias of a spring of the receiver. An operation 3006 receives a rotational force in a first rotational direction (e.g., clockwise) guiding the hook about the post. An operation 3008 generates a first positive feedback in response to the rotational force and the inward force. In one implementation, the first positive feedback is generated in response to contact between the post and the engagement plate, preventing further translational movement in an inward direction and rotational movement in the first rotational direction. An operation 3010 translates the wheel cover assembly outwards in connection with a second positive feedback generated by the spring bias of the spring. The outward translation locks the wheel cover assembly in position on the receiver.

Figure 31:
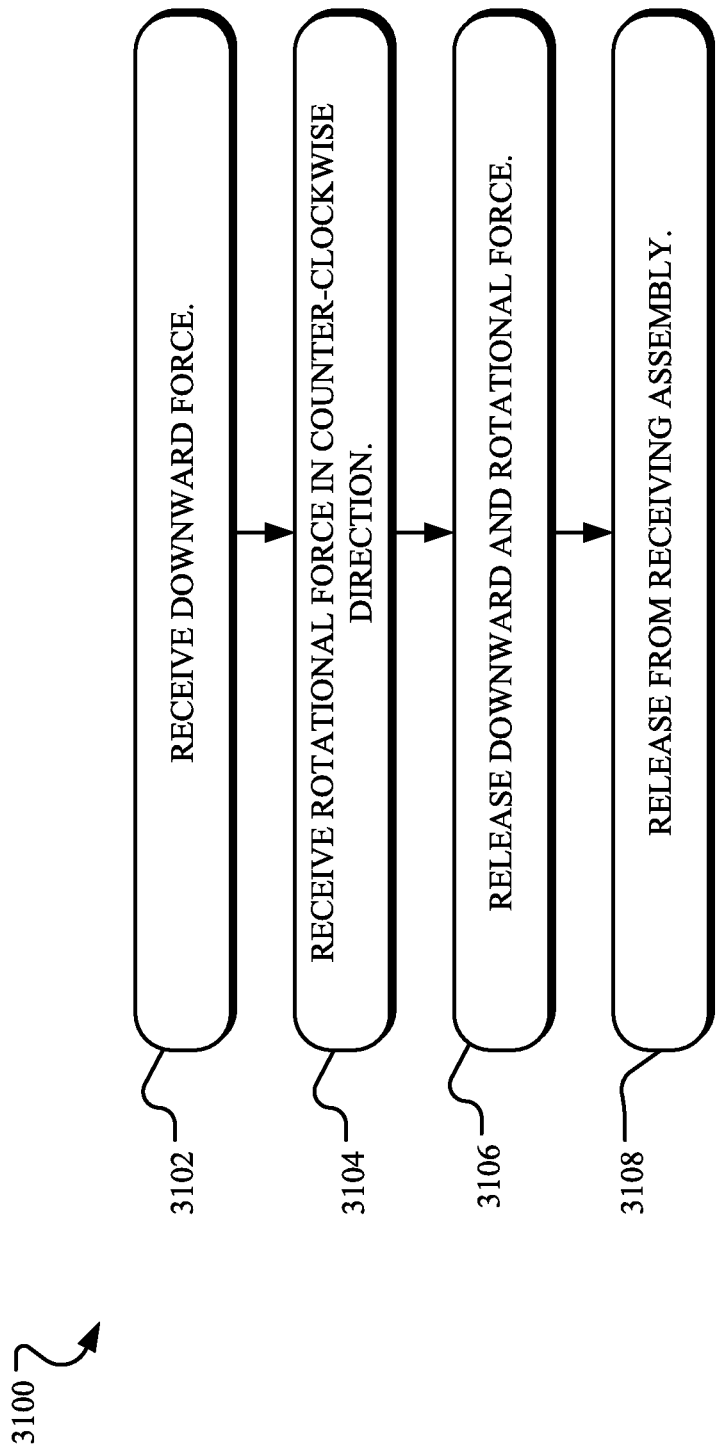
FIG. 31 illustrates example operations for removal of a wheel cover assembly from a receiver.

FIG. 31 illustrates example operations 3100 for removal of a wheel cover assembly from a receiver. An operation 3102 receives an inward force on the wheel cover assembly overcoming a spring bias of a spring of the receiver. An operation 3104 receives a rotational force in a rotational direction (e.g., counterclockwise). An operation 3106 disengages a groove of an engagement plate of the wheel cover assembly from a post of the receiver using the inward and rotational forces. An operation 3108 releases the wheel cover assembly from the receiver using the spring bias of the spring. In other words, the spring bias of the spring translates the wheel cover in an outward direction, releasing it from the receiver.

Figure 32:
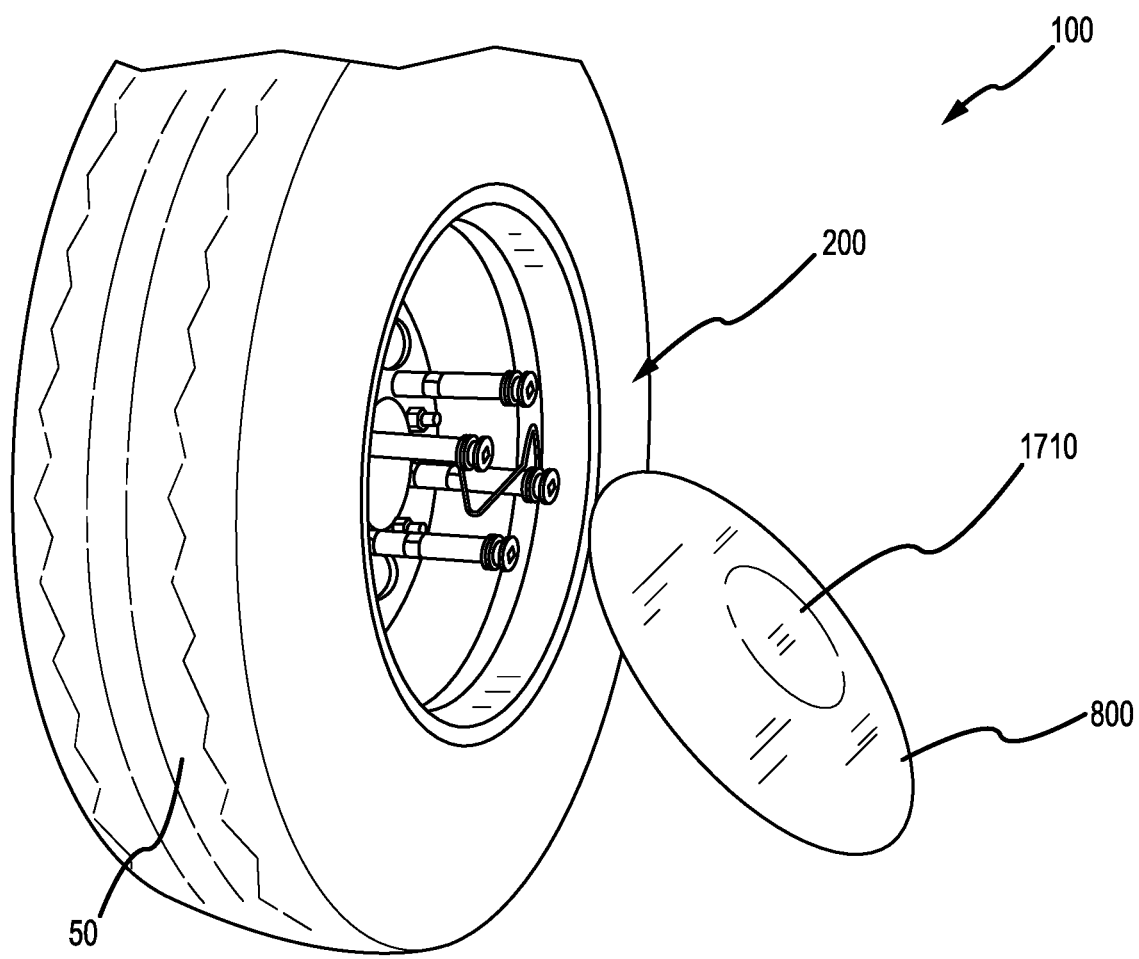
FIG. 32 show an example wheel cover system mounted on a wheel of a vehicle with the wheel cover removed.
Figure 33:
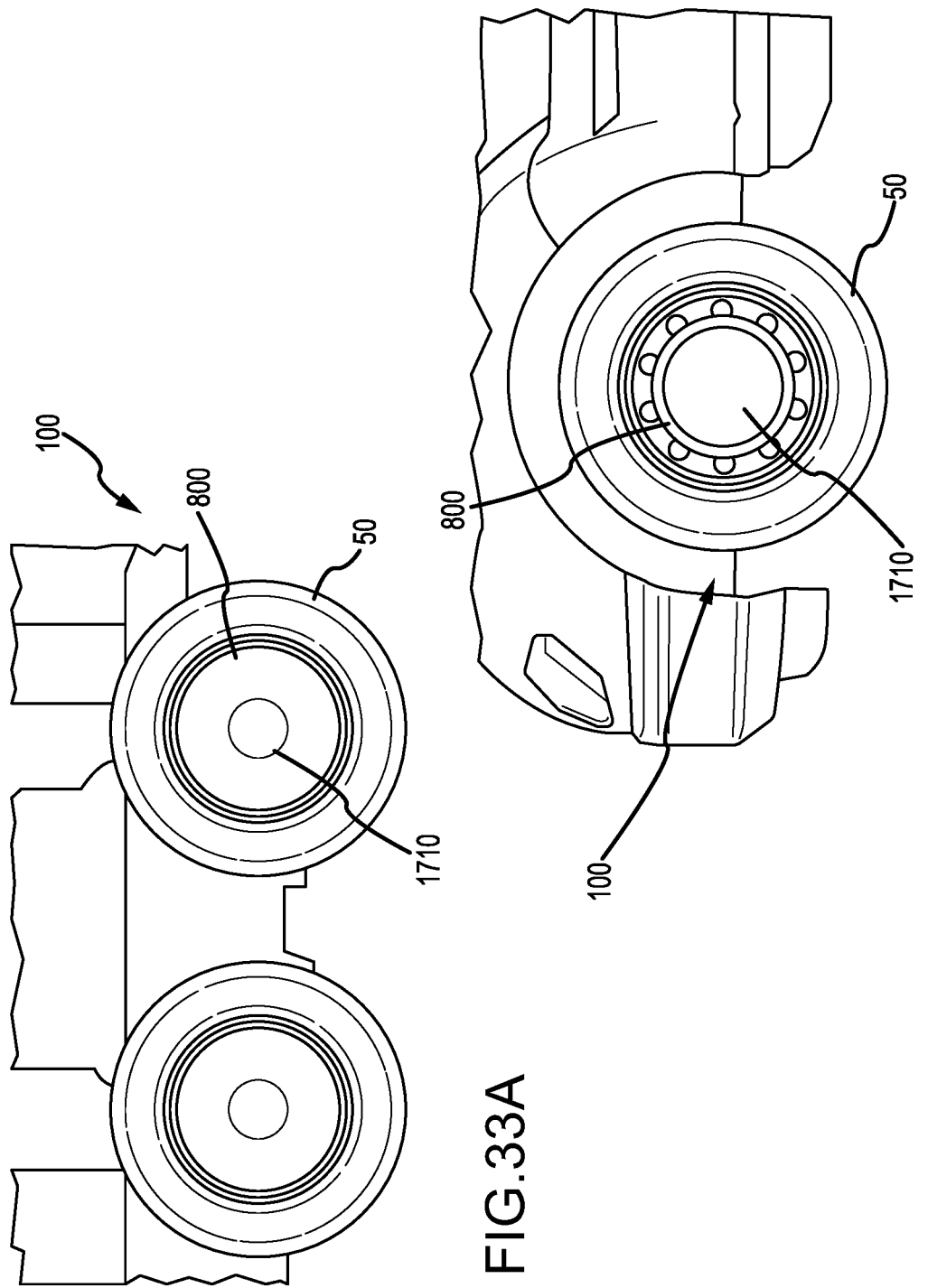
FIG. 33A illustrates an example wheel cover system mounted on a rear wheel of a vehicle.
FIG. 33B illustrates an example wheel cover system mounted on a front wheel of a vehicle.

FIG. 32 shows an example wheel 50 with the receiver 104 of the wheel cover system 100 mounted to the hub 200 and the wheel cover 800 of the wheel cover assembly 102 shown removed. FIGS. 33A-B illustrate examples of the wheel cover 800 mounted to a rear wheel and front wheel, respectively, of a vehicle, such as a truck.

Figure 34:
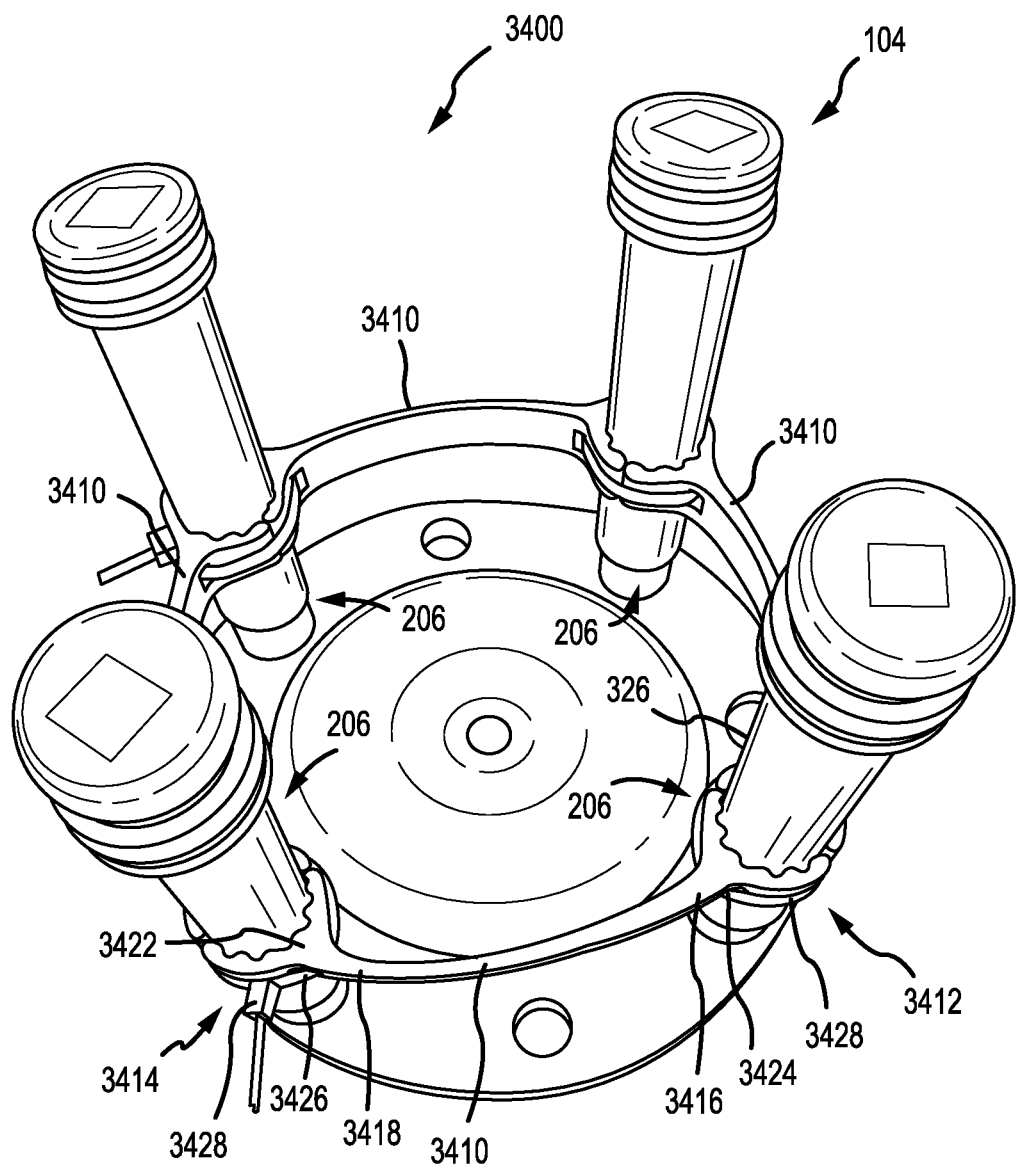
FIG. 34 is a top, tilted view of an example stabilizer assembly mounted on an example receiver of an example wheel cover assembly.

Turning to FIG. 34, a top, tilted view of an example stabilizer assembly 3400 mounted on the receiver 104 of the example wheel cover assembly 102 is shown. The stabilizer assembly 3400 includes a plurality of bars 3410. In the illustrated example, the plurality of bars 3410 includes four bars, although the assembly 3400 can include less than four bars or more than four bars. In the illustrated example, each of the plurality of bars 3410 is generally crescent shaped with a first end 3412 and a second end 3414 opposite the first end 3412. In another example, the portion extending between the first end 3412 and the second end 3414 is straight. The second end 3414 is also a mirror image of the first end 3412, though the second end 3414 can be shaped differently than the first end 3412 in other examples. In the illustrated example, both the first end 3412 and the second end 3414 include a first transition portion 3416 and a second transition portion 3418, respectively, tapering from the bar 3410 to an open jaw.

Each of the jaws includes a seat having a cylindrical surface 3422. The open cylindrical surface 3422 includes an arc having a radius substantially equal to a radius of the post 206, such that the first end 3412 and second end 3414 are substantially flush when in contact with the post 206. In one example, the cylindrical surface 3422 of each of the first end 3412 and the second end 3414 are hex shaped to compliment and receive a hex portion 301 of the post 206, though the surface 3422 can be other shapes or forms. In another example, the cylindrical surface 3422 has ridges. The cylindrical surface 3422 may also be textured. Each of the plurality of bars 3410 has a first aperture 3424 and a second aperture 3426 extending through the bar 3410 at the first transition portion 3416 and the second transition portion 3418, respectively to receive a fastener 3428, discussed in more detail below. Each of the plurality of bars 3410 can be made from a solid material such as a metal, plastic, or the like.

Figure 35:
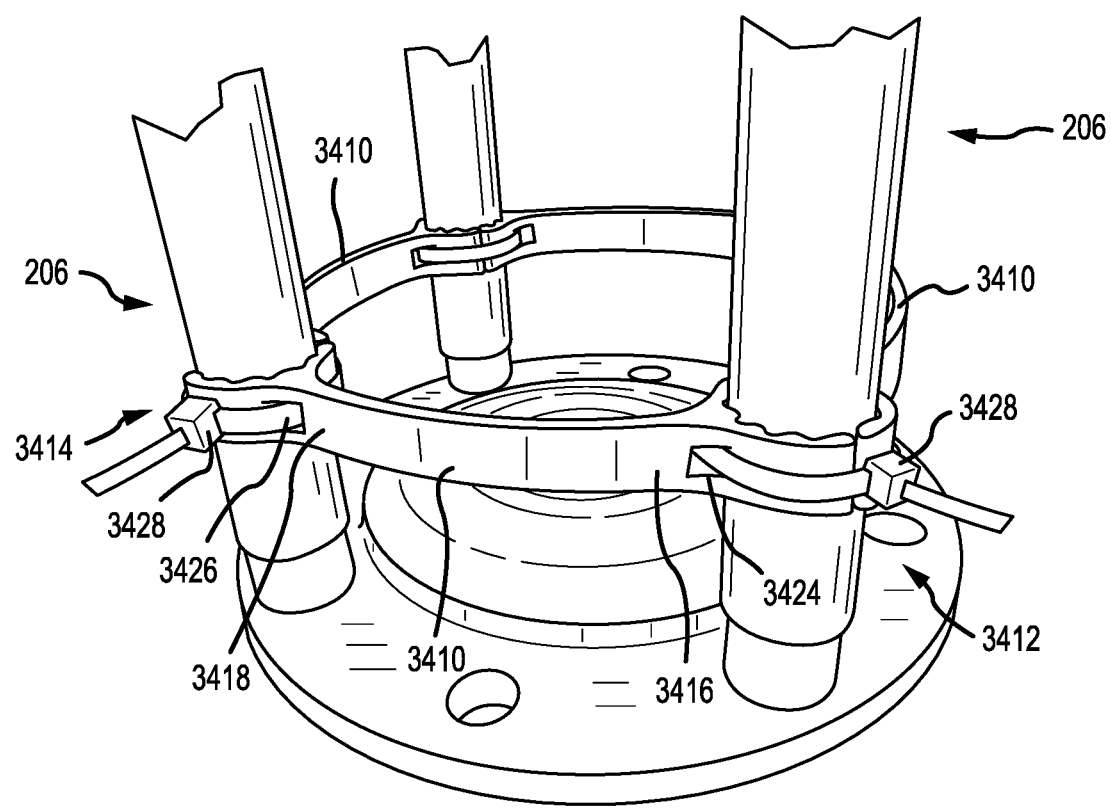
FIG. 35 is a side, tilted view of the example stabilizer assembly shown in FIG. 34.

FIG. 35 is a side, tilted view of the example stabilizer assembly 3400 shown in FIG. 34. During assembly, each of the plurality of bars 3410 is placed between two adjacent posts 206, with the first end 3412 contacting one of the posts 206 and the second end 3414 contacting another one of the posts 206. In one example, a first end of a first bar contacts one half of the post while a second end of a second bar contacts the other half of the post. The hex shaped cylindrical surface 3422 allows the first end 3412 and the second end 3414 to simply snap onto the hex portion 301 of the post 206, such that a bar can be snapped onto two posts and held in place without additional aid. In other words, the first end 3412 or the second end 3414 engage with the hex portion 301 of the post 206 to positively lock the first end 3412 or the second end 3414 to the post 206. The post 206 may also be slightly rotated to aid the bar in snapping onto the hex portion 301. Further, the hex shaped surface 3422 can provide increased friction for the first end 3412 and the second end 3414 to engage the hex portion 301 of the post 206. In the illustrated example, four bars capture the hex portion 301 of each of the four posts and when viewed from above, forms a circle. The fastener 3428 couples the first end 3412 of the first bar 3410 to the second end 3414 of the second bar 3410. The fastener 3428 can be a hose clamp, cable ties, or the like. In one example, the fastener 3428 is a stainless steel clip. In the illustrated example, the fastener 3428 is a zip-tie which is threaded through the first aperture 3424 of the first bar 3410 and through the second aperture 3426 of the second bar 3410 and tightened such that the first end 3412 of the first bar 3410 and the second end 3414 of the second bar 3410 contact the stem surface 326 and substantially wrap around a circumference of the post 206 at the hex portion 301.

The fastener 3428 exerts a force radially inward against the first end 3412 of the first bar 3410 and the second end 3414 of the second bar 3410, which creates an interference fit between the first end 3412 and the second end 3414 and the post 206. Stated differently, the fastener 3428 pushes the first end 3412 and the second end 3414 towards the post 206, capturing the post 206 between the first end 3412 and the second end 3414 and creating a press or friction fit between the first end 3412 and the second end 3414 and the post 206. The interference fit prevent the posts from loosening, as well as provides stability to the post as they remain firmly attached. In more detail, when the vehicle is in motion and produces vibrations, the vibrations will be directed to the stability bars instead from the posts, which prevent the posts from becoming loose due to vibrations.

In another example not shown, the first end and the second end can each include a pair of opposing apertures, wherein the pair of opposing apertures align with each other. A pair of nuts and bolts can be fastened through each of the aligned pair of opposing apertures and tightened until the interference fit is produced.

Figure 36:
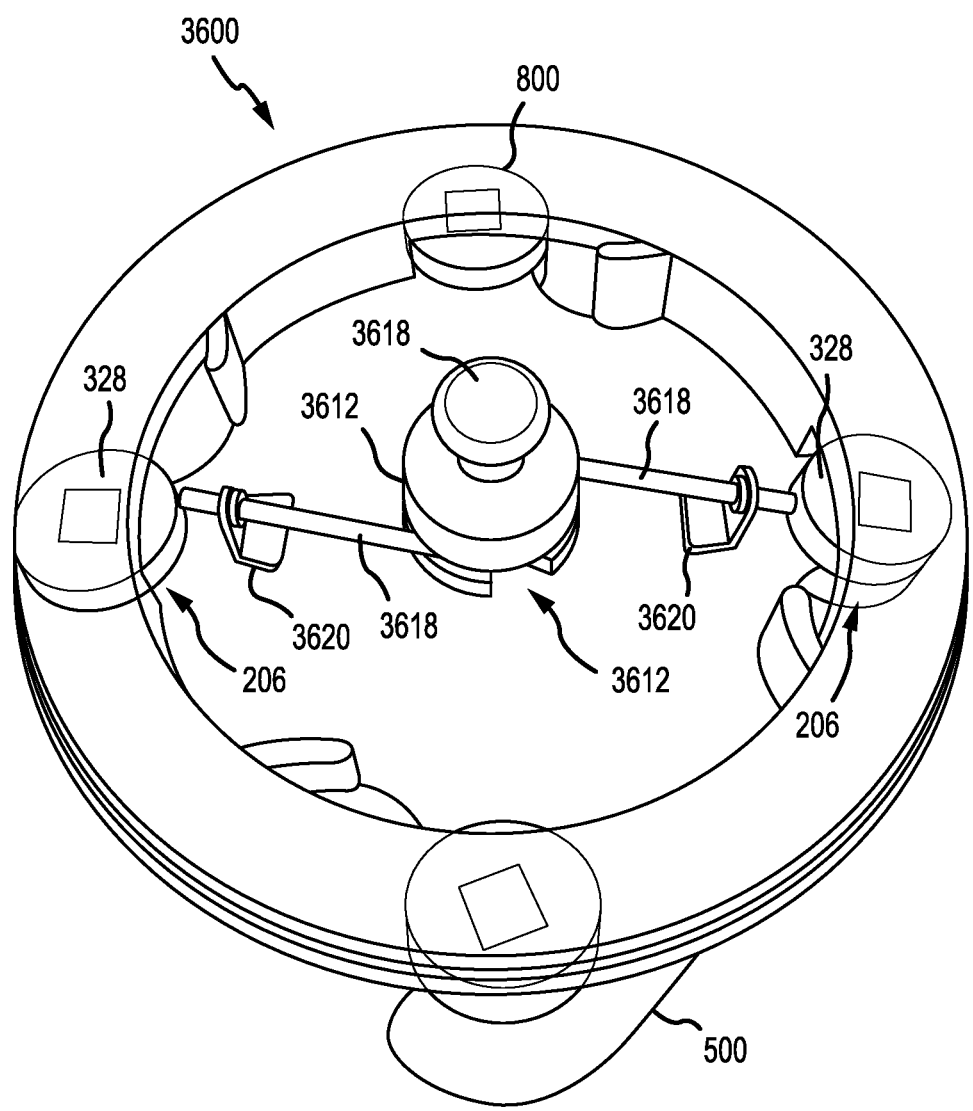
FIG. 36 is a top, tilted view of an example locking mechanism in an unlocked orientation.
Figure 37:
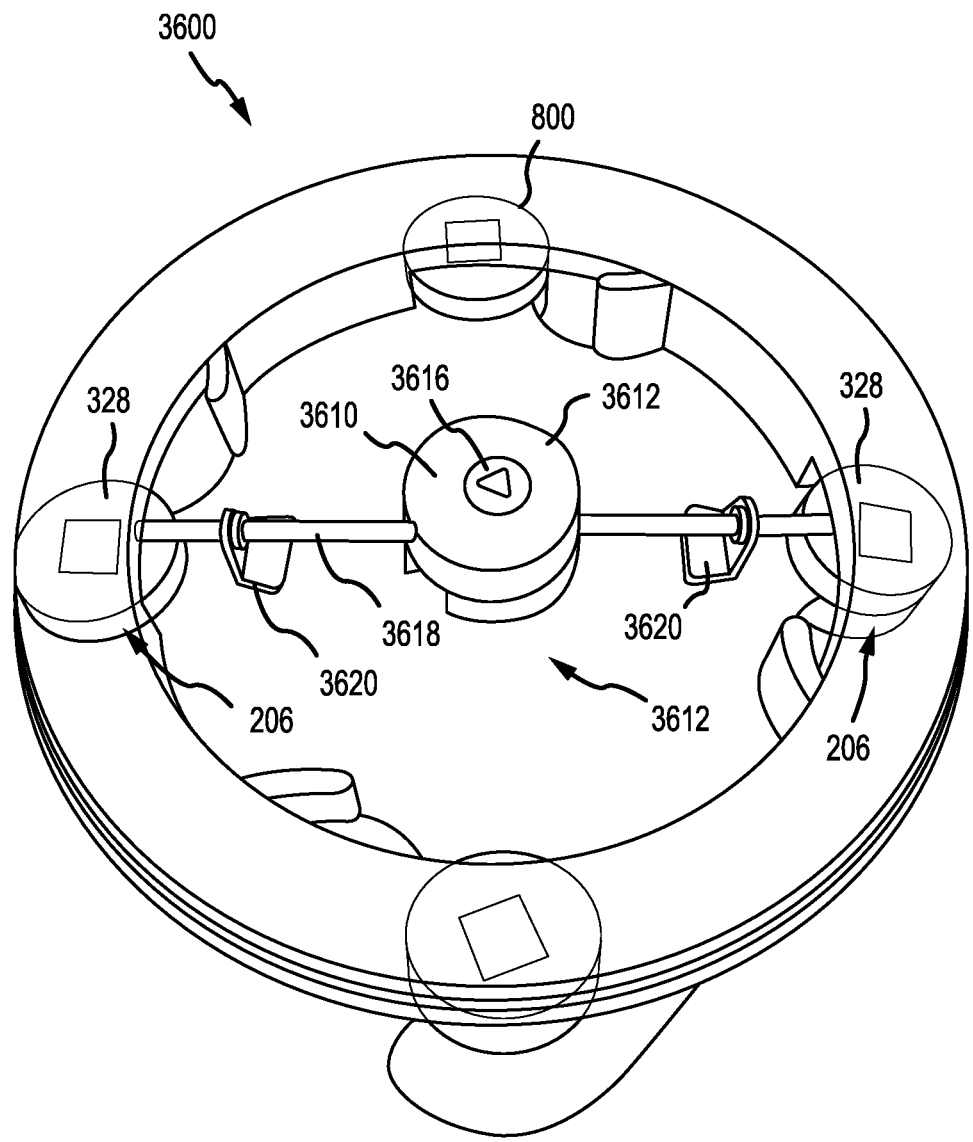
FIG. 37 is another top, tilted view of the example locking mechanism shown in FIG. 36 in a locked orientation.
Figure 38:
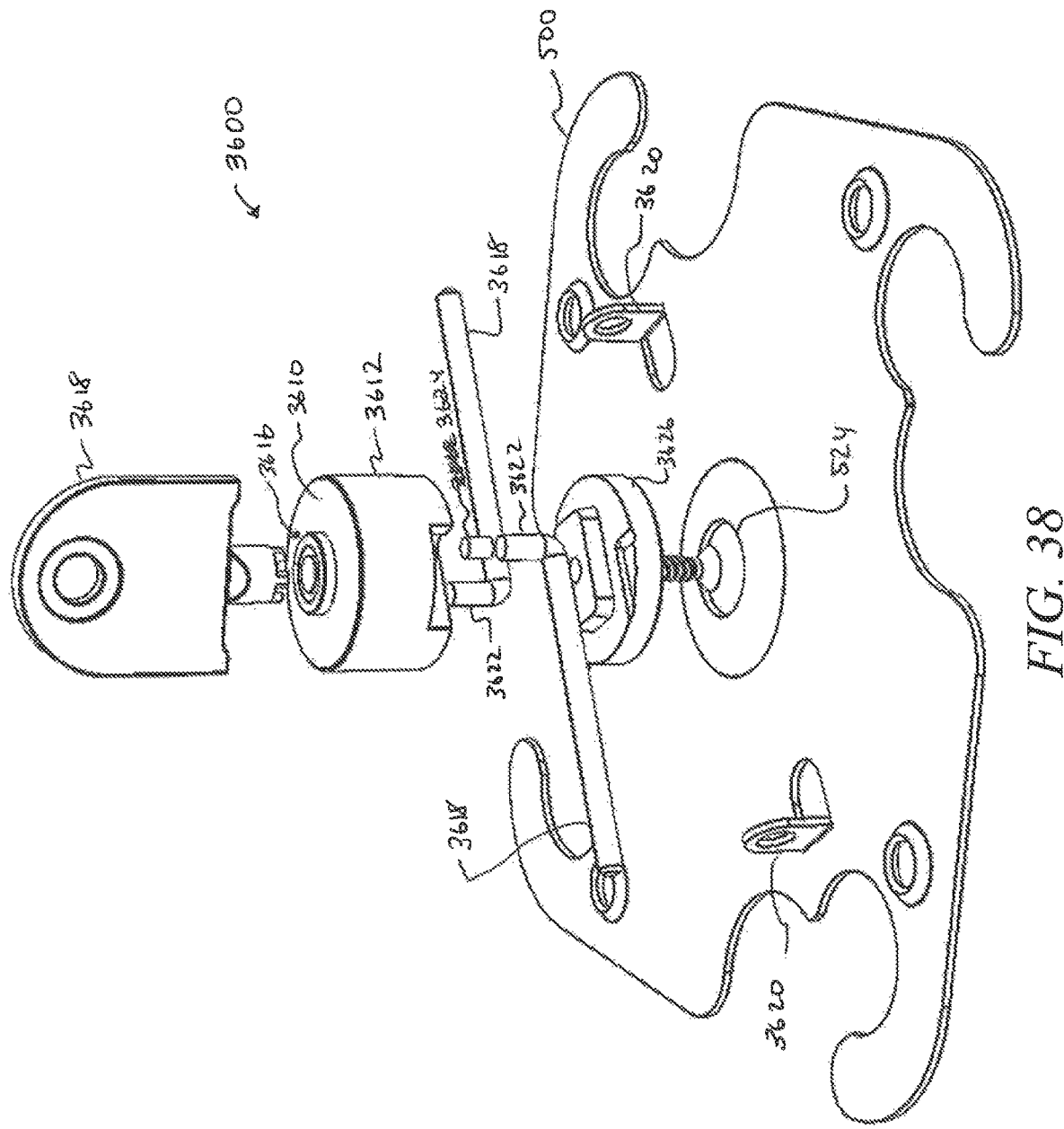
FIG. 38 is an isometric, exploded view of an example locking mechanism.

Turning to FIGS. 36-38, a top, tilted view of an example locking mechanism 3600 in an unlocked orientation and a locked orientation and an isometric, exploded view of another example locking mechanism 3600, respectively, are illustrated. The locking mechanism 3600 is positioned on a center of the plate 500 and essentially inhibits the wheel cover 800 from being pushed inward, thus preventing the wheel cover 800 from being rotated and removed from the plate 500. Though the wheel cover 800 is shown transparent, the wheel cover 800 can be opaque, which can advantageously hide the mechanism of the locking mechanism 3600. The locking mechanism 3600 includes a center mechanism 3612 that is generally cylindrical shaped and includes a first surface 3610 and a second surface 3638, shown in FIG. 40A, opposite the first surface 3612. The locking mechanism 3600 includes a pair of bars 3618 coupled to the center mechanism 3612 and secured to the center mechanism 3612 by a receiver receptacle 3626.

Figure 39B:
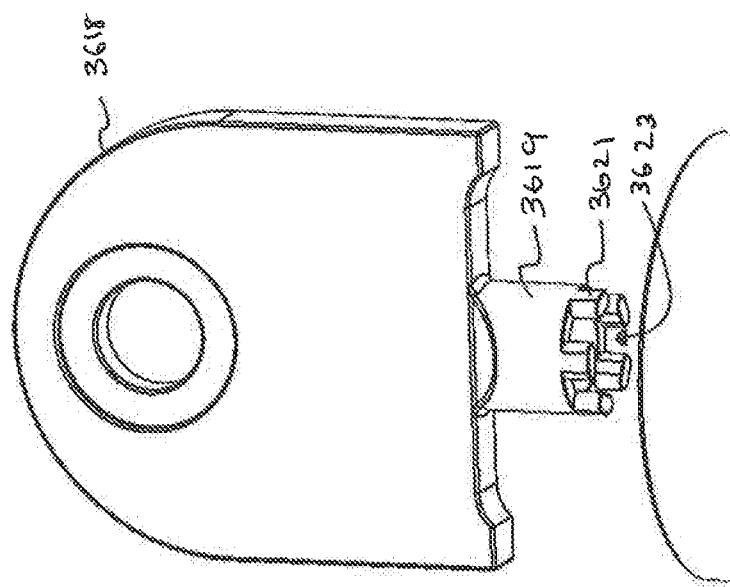
FIGS. 39A-B are a detailed view of a center mechanism of the example locking mechanism shown in FIG. 38 and a detailed view of a key of the example locking mechanism shown in FIG. 38, respectively.
Figure 39A:
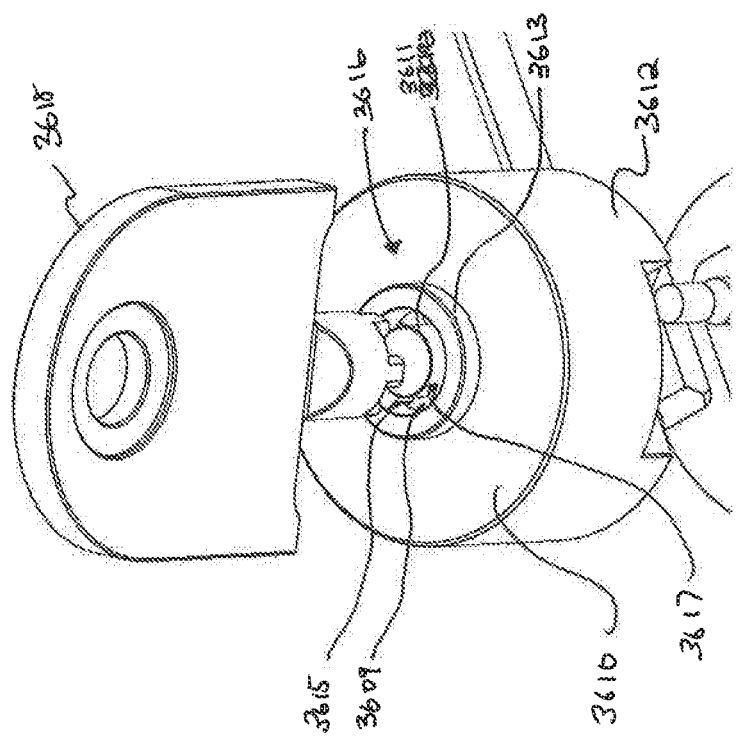

As shown in FIGS. 39A-B, a detailed view of a keyway 3616 disposed on the first surface 3610 of the center mechanism 3612 and a corresponding key 3618 are shown, respectively. The keyway 3616 includes a ring depression 3617 extending into the first surface 3610 and having a center axis equal to a center axis of the center mechanism 3612. The ring depression 3617 defines a keyway surface 3609 spaced between the first surface 3610 and the second surface 3638. The keyway surface 3609 includes a plurality of keyway apertures 3615 circularly spaced around a keyway center 3611. The keyway apertures 3615 may receive a corresponding set of key protrusions 3621 of the key 3618 and may capture the set of key protrusions 3621 so that when the key 3618 is rotated, the center mechanism 3612 is also rotated. The keyway center 3611 protrudes from the keyway surface 3609 to the first surface 3610 and may be received by a bore 3623 of the key 3618, which may align the key 3618 on the keyway 3616. A flange 3613 is disposed on the first surface 3610 around a perimeter of the ring depression 3617, and may be received in a similarly shaped opening on the wheel cover 800 to couple the center mechanism 3612 to the wheel cover 800.

Figure 40A:
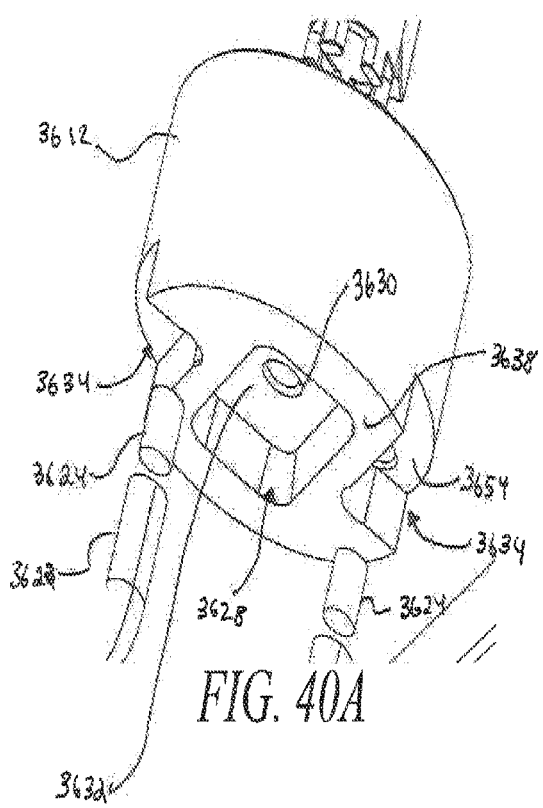
FIGS. 40A-C are a detailed bottom view of the center mechanism of the example locking mechanism shown in FIG. 38, a detailed top view of a receiver receptacle of the example locking mechanism shown in FIG. 38, and a bottom view of the center mechanism of the example locking mechanism shown in FIG. 38, respectively.
Figure 40B:
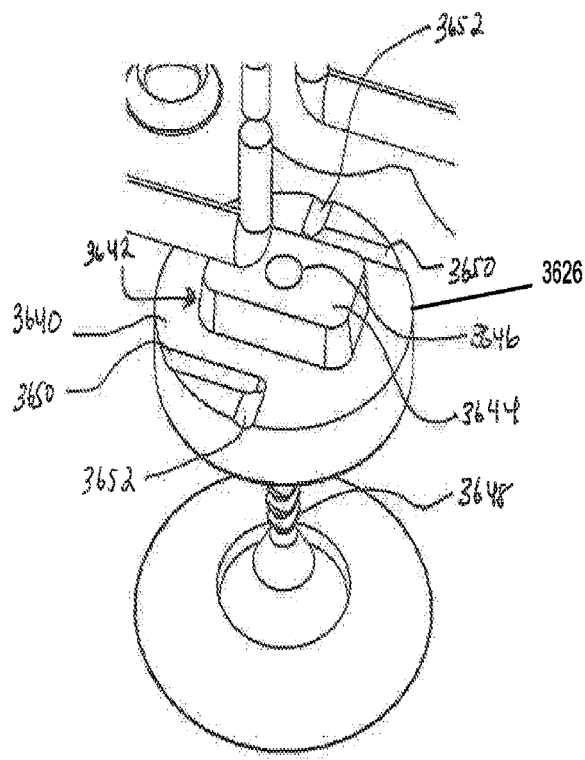
Figure 40C:
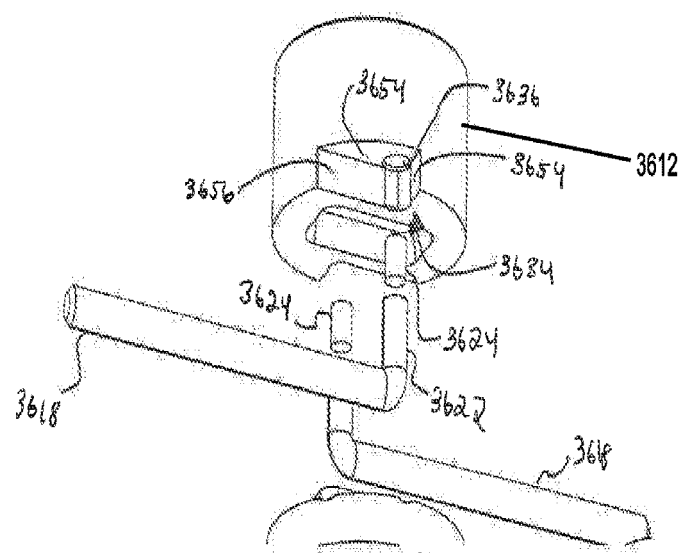

Turning to FIGS. 40A-C, a detailed bottom view of the center mechanism 3612, a detailed top view of the receiver receptacle 3626, and a bottom view of the center mechanism 3612 are respectively shown. The center mechanism 3612 includes a pair of mirroring and opposing bar cutouts 3634 extending from the second surface 3638 towards the first surface 3610. Each of the bar cutouts 3634 define a bar surface 3654 parallel to the second surface 3638 and a lock surface 3654 and an unlock surface 3656, both of which are perpendicular to the bar surface 3654. Further, the lock surface 3654 and the unlock surface 3656 are perpendicular to each other. A bar aperture 3636 is disposed on the bar surface 3654 and is parallel to the center axis of the center mechanism. The bar aperture 3636 is operable to receive an extension 3622 of the bar 3618, thereby coupling the bar 3618 to the center mechanism 3612. The extension 3622 is bent 90 degrees from the bar 3618 and may have a length shorter than a length of the bar 3618. The extension 3622 may have a further elastomeric extension 3624 on a top of the extension 3622. The elastomeric extension 3624 may also be a separate piece, as illustrated. The elastomeric extension 3624 is positioned in the bar aperture 3636 prior to the extension 3622 and provides a spring resistance to provide feedback to the user during use. The bar cutout 3634 is shaped to provide a space for the bar 3618 to move through when the center mechanism 3612 is rotated.

The center mechanism 3612 also includes an alignment depression 3628 extending into the second surface 3638 and defining a first alignment surface 3632. The alignment depression 3628 is generally rectangular shaped and is sized to receive a corresponding alignment protrusion 3642 of the receiver receptacle 3626 to align the receiver receptacle 3626 to the center mechanism 3612. The alignment protrusion 3646 protrudes from a first receiver surface 3640 and defines a second alignment surface 3644, which contacts the first alignment surface 3632 when the receptacle 3626 is aligned with the center mechanism 3612. The receiver receptacle 3626 also includes a pair of detents having a first detent 3650 and a second detent 3652. In one example the first detent 3650 is longer than the second detent 3652, though the first detent 3650 and the second detent 3652 can be the same length or the second detent 3652 can be longer than the first detent 3650. The pair of detents 3650, 3652 receives the pair of bars 3618 and provides a feedback loop to the user indicating when the lock or unlock position has been achieved, with the first detent 3650 indicating that the pair of bars 3618 is in the in the unlock orientation and the second detent 3652 indicating that the pair of bars 3618 is in the lock orientation. The receiver receptacle 3626 also includes a second alignment aperture 3646, which extends through the receptacle 3626 from a second receiver surface to the first receiver surface 3640 and aligns with a first alignment aperture 3630 of the center mechanism 3612. The first alignment aperture 3630 and the second alignment aperture 3646 receive an alignment fastener 3648, which secures the receiver receptacle 3626 to the center mechanism 3612, thereby also securing the pair of bars 3618 between the center mechanism 3612 and the receiver receptacle 3626. The alignment fastener 3648 can further be received by the center opening 524 of the plate, thereby securing the locking assembly 3600 to the plate 500.

The locking assembly 3600 may include a pair of supporting brackets 3620 shown in FIGS. 36-38. The supporting brackets 3620 can be separate pieces coupled to the plate 500, as shown in FIGS. 36-37 or may be formed on the plate 500 directly, as shown in FIG. 38. Further, the locking mechanism 3600 may include no brackets, one bracket, or more than two brackets.

In use, a user inserts the key 3618 into the keyway 3616 and rotates the key 3618, thereby rotating the center mechanism 3612. When the center mechanism 3612 is rotated in a first direction, e.g. counter-clockwise, each of the pair of bars 3618 is retracted towards the center mechanism 3612 and away from two opposing posts 206, defining the unlocked orientation shown in FIG. 36. In the unlocked orientation, the pair of bars 3618 are parallel to the unlock surface 3656 and are positioned in the first detent 3650. The bars 3618 do not impede the wheel cover 800 from being pushed down and rotated off of the opposing posts 206 in the unlocked orientation. Conversely, when the center mechanism 3612 is rotated in a second direction, e.g. clockwise, each of the pair of bars 3618 are pushed away from the center mechanism 3612, through the pair of supporting brackets 3620, and towards the two opposing posts 206. In the locked orientation, the pair of bars 3618 are parallel to the lock surface 3654 and are positioned in second detent 3652.

To lock the locking mechanism, the key 3618 is rotated clockwise to rotate the center mechanism 3612 and push the pair of bars 3612 into a space between the two opposing post 206 and the wheel cover 800. In the locked orientation, shown in FIG. 37, each of the pair of bars 3618 is positioned above the top surface 328 of each of the two opposing posts 206. In the locked orientation, the wheel cover 800 cannot be pushed down and rotated off of the posts 206, as the pair of bars 3612 physically obstruct the wheel cover 800. Stated differently, the pair of bars 3612 physically obstruct the inward path of the wheel cover 800 and prevent the wheel cover 800 from being pushed towards the plate 500. To unlock the locking mechanism 3600, the key 3618 is rotated counter-clockwise to remove the pair of bars 3612 from the space between the two opposing post 206 and the wheel cover 800.

Although the locking mechanism 3600 is shown with a pair of bars, the locking mechanism can include any number of bars including one bar or more than two bars. For example, the locking mechanism can include four bars, with each of the four bars extending over the top surface 328 of four posts.

Generally, the wheel cover system described provides various advantages over conventional assembly including ease of use and installation. The cover assembly allows for quick installation of the wheel cover onto the hub by simply pressing down and rotating the wheel cover onto the receiver. Furthermore, the total parts count for the wheel cover quick mount is less than conventional assemblies. In one implementation, the total count is 16 parts including the center hub, four posts, and a spring. Having fewer parts allows for quicker and simpler installation of the assembly. As illustrated, the cover assembly can be easily and quickly installed or removed from the receiver without tools. To install, the cover is simply pushed inwards and rotated clockwise. To remove, the cover is pushed inwards and rotated counter-clockwise. The method of installation is unique as the method completely conceals the confines of the wheel cover wheel cover system. Nothing touches the wheel and the wheel cover appears to float on the wheel. Furthermore, the function of installation does not hinder aerodynamics of the wheel cover, which may provide relief from a paddle wheel effect.

The description above includes example systems, methods, techniques, and/or instruction sequences that embody techniques of the present disclosure. However, it is understood that the described disclosure may be practiced without these specific details. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various implementations of the disclosure or described with different terminology. These and other variations, modifications, additions, and improvements may fall within the scope of the disclosure as defined in the claims that follow.

What is claimed is:

1. A wheel cover system for covering a wheel of a vehicle with a wheel cover assembly, the wheel having a stud extending in an outward direction away from a hub, the wheel cover system comprising:
   a stabilizer bar having a stabilizer body extending between first and second ends;
   first and second stabilizer bar jaws respectively disposed at the first and second ends of the stabilizer bar;
   an additional stabilizer bar having an additional stabilizer body extending between first and second ends;
   first and second additional stabilizer bar jaws respectively disposed at the first and second ends of the additional stabilizer bar; and
   a fastener creating a coupling engagement of one of the first and second stabilizer bar jaws to a corresponding one of the first and second additional stabilizer bar jaws, the coupling engagement creating an interference fit of the stabilizer bar and the additional stabilizer bar with a post engageable to the stud, wherein the stabilizer bar body and the additional stabilizer bar body extend away from the post in opposing directions.

2. The wheel cover system of claim 1, wherein the stabilizer bar further includes a first transition portion extending from the stabilizer body to one of the first and second of stabilizer bar jaws and a second transition portion extending from the stabilizer body to another of the first and second stabilizer bar jaws.

3. The wheel cover system of claim 2, wherein the stabilizer bar further includes a first aperture extending through the first transition portion and a second aperture extending through the second transition portion.

4. The wheel cover system of claim 3, wherein the fastener extends through one of the first and second apertures of the stabilizer bar and a corresponding aperture of the additional stabilizer bar.

5. The wheel cover system of claim 1, wherein the first and second stabilizer bar jaws and the first and second additional stabilizer bar jaws respectively include a seat having a cylindrical surface and radius mirroring a radius of the post.

6. A wheel cover system for covering a wheel of a vehicle with a wheel cover assembly, the wheel having a pair of studs each extending in an outward direction away from a hub, the wheel cover system comprising:
   a center mechanism coupled to a wheel cover of the wheel cover assembly, the center mechanism including a pair of bar apertures;
   a receiver receptacle secured to a plate of the wheel cover assembly and including a receiver receptacle surface;
   a pair of bars secured to the center mechanism through engagement with the receiver receptacle surface, wherein the pair of bar apertures respectively receive one of the pair of bars; and a keyway disposed in a surface of the center mechanism adjacent the wheel cover, the keyway configured to receive a key movable between a first orientation and a second orientation, the first orientation extending the pair of bars in a first direction away from the center mechanism and towards a pair of posts each engageable to a respective stud of the pair of studs, where the pair of bars is positioned over respective top surfaces of each of the pair of posts, the second orientation retracting the pair of bars in a second direction away from the pair of posts and towards the center mechanism.

7. The wheel cover system of claim 6, wherein the receiver receptacle surface includes a first detent corresponding to the first orientation and a second detent corresponding to the second orientation, and wherein the pair of bars enter the first detent when in the first orientation and the pair of bars enter the second detent when in the second orientation.

8. The wheel cover system of claim 7, wherein the first detent provides a first positive feedback loop to indicate that the locking mechanism is in the first orientation and the second detent provides a second positive feedback loop to indicate that the locking mechanism is in the second orientation.

9. The wheel cover system of claim 6, wherein each of the pair of bars is bent perpendicularly and includes a first portion received by one of the pair of bar apertures and a second portion extending away from the center mechanism, the first portion being shorter than the second portion.

10. The wheel cover system of claim 9, wherein the first portion of each of the pair of bars includes an elastomeric tip.

11. The wheel cover system of claim 6, further comprising a pair of brackets secured to the pair of bars and configured to provide support to the pair of bars.

12. The wheel cover system of claim 6, wherein the first orientation is a locked orientation and the second orientation is an unlocked orientation.

13. A wheel cover system for covering a wheel of a vehicle with a wheel cover assembly, the wheel having a first stud and a second stud each extending in an outward direction away from a hub, the wheel cover system comprising:
　a first post engageable to the first stud;
　a second post engageable to the second stud;
　a spring having a first hook and a second hook, the first hook engaged to the first post and the second hook engaged to the second post, the spring having a spring bias configured to generate an outward force in the outward direction away from the hub at a spring engagement point, the first post and the second post configured to releasably engage the wheel cover assembly with the spring holding the wheel cover assembly in a locked position
　a first stabilizer bar having a first jaw disposed at a first end of a first stabilizer body;
　a second stabilizer bar having a second jaw disposed at a second end of a second stabilizer body; and
　a fastener creating a coupling engagement of the first jaw to the second jaw, the coupling engagement creating an interference fit of the first stabilizer bar and the second stabilizer bar with the first post, wherein the first and second stabilizer bar bodies extend away from the post in opposing directions.

14. The wheel cover system of claim 13, wherein the first stabilizer bar includes a first transition portion extending from the first stabilizer body to the first jaw and the second stabilizer bar includes a second transition portion extending from the second stabilizer body to the second jaw, the first transition portion including a first aperture and the second transition portion including a second aperture, the fastener extending through the first aperture and the second aperture.

15. The wheel cover system of claim 13, wherein the first jaw and the second jaw each includes a seat having a cylindrical surface and radius mirroring a radius of the first post.

16. The wheel cover system of claim 13, further comprising:
　a pair of bars moveable between a first position and a second position, the first position including the pair of bars positioned over respective top surfaces of the first post and the second post, the second position including the pair of bars retracted towards a center mechanism coupled to a wheel cover.

17. The wheel cover system of claim 16, wherein the first position secures the wheel cover assembly in the locked position and the second position permits the wheel cover assembly to be removed from the locked position.

18. The wheel cover assembly of claim 16, wherein the pair of bars is movable between the first position and the second position using a key.

* * * * *